(12) United States Patent
Tanaka

(10) Patent No.: US 6,471,772 B1
(45) Date of Patent: Oct. 29, 2002

(54) LASER PROCESSING APPARATUS AND LASER PROCESSING METHOD

(75) Inventor: Koichiro Tanaka, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 19 days.

(21) Appl. No.: 09/680,552

(22) Filed: Oct. 5, 2000

Related U.S. Application Data

(62) Division of application No. 09/061,488, filed on Apr. 16, 1998, now Pat. No. 6,176,926.

(30) Foreign Application Priority Data

Apr. 17, 1997 (JP) .............................................. 9-115275

(51) Int. Cl.$^7$ .............................................. C30B 35/00
(52) U.S. Cl. ...................... 117/200; 117/900; 117/904; 438/147; 438/149
(58) Field of Search ................. 117/200, 900, 117/904; 438/147, 149

(56) References Cited

U.S. PATENT DOCUMENTS

| | | | |
|---|---|---|---|
| 5,365,875 A | 11/1994 | Asai et al. | |
| 5,760,405 A | 6/1998 | King et al. | 250/423 R |
| 5,837,568 A | 11/1998 | Yoneda et al. | 438/147 |
| 5,858,819 A | 1/1999 | Miyasaka | 438/149 |
| 5,879,977 A | 3/1999 | Zhang et al. | |
| 5,900,980 A | 5/1999 | Yamazaki et al. | |
| 5,959,779 A | 9/1999 | Yamazaki et al. | |
| 6,104,535 A | 8/2000 | Tanaka | |
| 6,110,770 A | 8/2000 | Zhang et al. | |
| 6,137,633 A * | 10/2000 | Tanaka | 359/619 |
| 6,160,827 A | 12/2000 | Tanaka | |
| 6,165,876 A | 12/2000 | Yamazaki et al. | 438/517 |
| 6,212,012 B1 | 4/2001 | Tanaka | |
| 6,239,913 B1 | 5/2001 | Tanaka | |
| 6,249,385 B1 | 6/2001 | Yamazaki et al. | |
| 6,304,385 B1 | 10/2001 | Tanaka | |

FOREIGN PATENT DOCUMENTS

| | | |
|---|---|---|
| JP | 6-244104 | 9/1994 |
| JP | 7-61781 | 3/1997 |
| JP | 9-61781 | 3/1997 |

OTHER PUBLICATIONS

Koichiro Tanaka, Ser. No. 09/704,386, patent application "Laser Irradiating Device and Laser Irradiating Method" dated Oct. 31, 2000.
Koichiro Tanaka, Ser. No. 09/823,043, patent application "Laser Optical Apparatus", dated Mar. 29, 2001.

* cited by examiner

Primary Examiner—Felisa Hiteshew
(74) Attorney, Agent, or Firm—Fish & Richardson P.C.

(57) ABSTRACT

A laser irradiating apparatus includes a cylindrical lens group that divides a laser beam and a cylindrical lens that re-couples a laser beam as divided. The cylindrical lens is shaped in a parallelogram whose angles are not a right angle, thereby being capable of dispersing a portion where interference is strengthened in a laser beam to restrain irradiation unevenness.

22 Claims, 22 Drawing Sheets

LASER PROCESSING APPARATUS AND LASER PROCESSING METHOD

This is a divisional of U.S. application Ser. No. 09/061,488, filed Apr. 16, 1998, now U.S. Pat. No. 6,176,926 (allowed).

BACKGROUND OF THE INVENTION

1. Field of the Invention

The present invention relates to a structure in which a laser beam which has been processed into a linear beam is scanned and irradiated. The present invention can be used in a process for manufacturing a semiconductor device using the emission of a laser beam, an exposing process using the irradiation of a laser beam, and so on.

2. Description of the Related Art

In recent years, there has been studied a technique of forming an amorphous semiconductor film or a crystalline semiconductor film (a semiconductor film having crystallinity such as polycrystal or microcrystal of non-monocrystal) on an insulating substrate made of glass or the like.

In this technical field, a technique has been widely researched in which laser annealing is conducted on an amorphous silicon film or a low-crystalline silicon film to crystalize the film or to improve crystallinity.

The glass substrate is inexpensive and rich in processing property, in comparison with a quartz substrate which has been conventionally frequently used, as a result of which it is advantageous in that a large-area substrate can be readily fabricated. This is a reason why the above study has been made. Also, the reason why the layer is frequently used for crystallization is that a melting point of the glass substrate is low. The laser can give a high energy to only the non-monocrystal film without largely changing the temperature.

Because a crystalline silicone film formed by laser annealing is high in mobility, a thin film transistor (TFT) is formed using the crystalline silicon film.

The above technique enables a monolithic liquid crystal electro-optic device where TFTs for pixels and drive circuits are disposed on a single glass substrate to be obtained.

A crystalline silicon film obtained by laser annealing are formed of a large number of crystal grains, and therefore is called "polycrystal silicon film" or "polycrystal semiconductor film".

In the above-described laser annealing technique, since a laser beam needs to be irradiated onto an area 10 cm square or more, the irradiating method must be devised.

There have been proposed some methods of irradiating a laser beam, for example:

(1) A laser beam is converted into a square spot of several cm square on a plane to be irradiated and irradiated thereon while it is scanned.

(2) A laser beam is processed through an optical system so as to be converted into a linear beam of several mm width x several tens cm length, and such a linear laser beam is irradiated on the plane while it is scanned.

Of those methods, in the method (1), portions where laser beams as irradiated are overlapped are increased, thereby being liable to make the irradiation effect uneven. Also, the productivity is low.

On the other hand, in the method (2), the irradiation unevenness is difficult to exhibit in comparison with the method (1), and the productivity is also high.

Particularly in the method (2), the use of the linear laser beam is different from the use of a spot-like laser beam requiring scanning in the front and rear direction and in the right and left direction in that the laser can be irradiated on the entire plane to be irradiated by scanning only in a direction (width direction) perpendicular to the linear direction (longitudinal direction) of the linear laser, the high productivity can be obtained. The reason that scanning is made in the direction perpendicular to the linear direction is that it is the scanning direction where the coefficient is the highest. Because of the high productivity, the use of the linear laser beam is a main stream for laser annealing at present.

However, there arise some problems when laser annealing is conducted on the non-monocrystal semiconductor film while scanning a pulse laser beam which has been processed into a line.

In particular, one of the severe problems is that laser annealing is not uniformly conducted on the entire film surface.

When the linear laser started to be used, a phenomenon that stripes are produced on portions where the adjacent beams are overlapped with each other was remarkable, and the semiconductor characteristic of the film was largely different depending on each of the stripes.

What is shown in FIG. 1A is a picture that photographs a surface state of a crystalline silicon film obtained by scanning a linear laser beam, which is longitudinal along a lateral direction of a paper surface, in its width direction (a vertical direction of the paper surface) and irradiating it on the crystalline silicon film.

As is apparent from FIG. 1A, the degree of overlapping the linear laser beam is reflected on the crystallinity, to thereby exhibit a striped pattern.

In the case of fabricating a liquid crystal display unit using a silicon film exhibiting the stripped pattern, for example, there occurs a disadvantage that the stripes appear as they are.

It is presumed that this results from reflecting a difference in crystallinity of the striped pattern on the characteristic of a TFT array.

The above problem can be greatly improved by improving a non-monocrystal semiconductor film on which a laser beam is to be irradiated, thinning the scanning pitches (intervals between the respective adjacent linear laser beams) of the linear laser beam, optimizing a condition under which the linear laser beam is scanned, or other manners. More specifically, in the application of a liquid crystal display device, the degree of overlapping the linear laser beams on each other can be restrained from directly adversely affecting an image quality.

However, subsequent to the solving of the problem caused by the overlapped pulse laser shots, the nonuniformity of the energy distribution of the beam per se has been remarkable.

In general, in the case of forming the linear laser beam, an original rectangular (or square, or circle) beam is processed into a line through an appropriate optical system.

The original rectangular beam is about 2 to 5 in aspect ratio. That original beam is deformed into a linear beam 100 or more in aspect ratio through an optical system. For example, it is deformed in a linear laser beam 1 mm in width and 200 mm in length.

The formation of the laser beam is devised such that an energy distribution within the laser beam gets uniform in quality. In particular, employing an optical system called "beam homogenizer," the energy density within the laser beam is made uniform.

An outline of the structure of a device for irradiating a linear laser beam is shown in FIG. 2. In FIG. 2, there are shown a laser oscillator indicated by reference numeral 201, a beam homogenizer consisting of lenses 202, 203, 204 and 205, a mirror 206 and an objective lens 207.

In this example, the combination of the lenses 203 and 205 is a beam homogenizer for improving the energy distribution in a longitudinal direction of the linear laser beam.

Also, the combination of the lenses 202 and 204 is a beam homogenizer for improving the energy distribution in a width direction of the linear laser beam.

The action of the beam homogenizer is that the original longitudinal beam is divided into a plurality of beams which are then enlarged, respectively, and re-superimposed on each other.

Seemingly, the beam divided and re-constructed by the beam homogenizer becomes more uniform in the distribution of energy as the division becomes more fine.

However, in fact, when the beam is irradiated onto the conductor film the stripped pattern shown in FIG. 1B appears regardles of the fineness of the division.

The stripped patterns are innumerably formed so as to be orthogonal to the longitudinal direction of the linear laser beam. The formation of such stripped pattern is caused by the stripped distribution of the energy of the original rectangular beam or optical system. laser obtains the intensity by making the phase coincide with each other, the laser beam is in phase) to unify the distribution of the energy, the stripes are the interference stripes of a light.

The interference of light is a phenomenon which is caused by a phase shift when lights in phase and identical in wavelength are superimposed on each other with an optical path difference, that is, by mutually cyclically strengthening or weakening the light.

FIG. 3 schematically shows an appearance where lights that have passed through five slits 301 are interfered with each other. FIG. 3 shows whether the lights entered from the left side of the slits are also interfered with each other on the right side of the slits, or not, with a light intensity I as a parameter.

In the case where the five slits 301 are located at regular intervals, a center of an interference peak occurs on a portion corresponding to a center A of the slit group.

Interference stripes are formed with that peak as a center.

Let us consider that the principle of the occurrence of the interference stripes shown in FIG. 3 is applied to a cylindrical lens group 401 and a cylindrical lens 402 shown in FIG. 4.

The cylindrical lens group 401 shown in FIG. 4 corresponds to the cylindrical lens group 203 shown in FIG. 2. Also, the cylindrical lens group 402 shown in FIG. 4 corresponds to the cylindrical lens group 205 shown in FIG. 2.

Also, portions A, B and C in FIG. 4 correspond to portions A, B and C in FIG. 3.

In FIG. 4, the number of divisions of beams made by the cylindrical lens group 401 corresponds to the number of slits shown in FIG. 3.

In case of the structure shown in FIG. 4, peaks of interferences (mutually strengthened portions) occur on the respective portions A, B and C in accordance with the principle shown in FIG. 3.

The actual interference stripes made by a laser do not exhibit distinct intensity with a complete periodic property. It is presumed that this phenomenon results from a slight optical shift in the optical system or the dispersion of an energy caused by heat conduction in a semiconductor film.

In FIG. 2, since the combination of the cylindrical lens group 202 and the cylindrical lens 204 gives the entire same action as that of the combination of the cylindrical lens group 203 and the cylindrical lens 205 to the laser beam, the same interference of light occurs in the width direction of beam within the linear laser beam.

However, since the light interference in the width direction of the linear laser beam occurs in an area several mm or less in width, it is almost inconspicuous. That is, there does not particularly arise any problems.

The above interference state of light within the linear laser beam is schematically shown in FIG. 6. In FIG. 6, reference numeral 601 denotes a plane onto which the linear laser beam is irradiated. Also, reference numeral 602 denotes a portion where the peak of interference is high.

Schematically as shown in FIG. 6, a peak 602 of interference distributes in a lattice manner in the region onto which the linear laser beam is irradiated. As described above, however, the peaks of interference in the width direction of the linear laser beam are almost inconspicuous.

In general, the distribution of the peaks of interference does not have uniform intervals. This is because the linear beam is obtained by linearly synthesizing spherical waves (If a spherical waver is straightly cut, the intervals of the in-phase stripes are not constant.).

In the case where the intervals of peaks of interferences are intended to be substantially constant, the plane waves may be synthesized into a linear wave using the optical system shown in FIG. 5 (if the plane wave is straightly obliquely cut, the intervals of the in-phase stripes are constant.).

A difference of the optical system shown in FIG. 5 from that of FIG. 4 resides in that laser beams divided by the cylindrical lens group 501 on the beam incident side is processed into a parallel light ray by a subsequent cylindrical lens 502.

The optical system of this type can be simply obtained by appropriately selecting a distance between the forward cylindrical lens group 401 and the backward cylindrical lens 402 in FIG. 4.

With the above arrangement, any beams divided by the cylindrical lens group 501 are processed into the plane waves by the cylindrical lens 502. When the beams processed by this optical system is used, the intervals of the vertical stripes become substantially constant.

As shown in FIG. 6, the linear laser beam exhibits the distribution of peaks of interference in a lattice manner within the beam.

Therefore, when the laser beam is scanned in the width direction of the linear laser beam and irradiated on the plane, a light beam strong or weak in the intensity of interference within the beam is caused to be repeatedly irradiated onto the same portion of an object to be irradiated.

As a result, stripes caused by the strong intensity or the weak intensity are formed along the beam scanning direction. That is, the striped pattern appears along the scanning direction of the laser beam.

The above-described striped pattern permits the peaks of light interference which distribute in the width direction perpendicular to the linear direction of the linear laser to be particularly emphasized by overlapping the linear lasers with each other at pitches sufficiently thinner than the beam width.

An appearance where stripes vertically transverse to the linear laser are formed is schematically shown in FIG. 7. A linear laser beam 701 periodically exhibits the intensity of an energy caused by the light interference in its linear direction (As already discussed in the above, the linear laser beam exhibits the intensity of periodic energy due to the light interference also in its width direction, but hardly adversely affects the present invention.

As shown in FIG. 7, the stripes are caused to be emphasized by overlapping those laser beams with each other.

In order to prevent the striped pattern from being emphasized as shown in FIG. 7, it is greatly effective that the linear laser beams are obliquely overlapped with each other as shown FIG. 8. This technique is disclosed in Japanese Patent Application Laid-open No. Hei 9-61781 of which application has been filed by the present applicant.

With the above arrangement, the peak portions of interference are distributed without being applied to the same location several times, thereby being capable of restraining the formation of the striped pattern.

However, the processing method shown in FIG. 8 suffers from such a problem that the length of a laser beam cannot be utilized at the maximum.

SUMMARY OF THE INVENTION

The present invention has been made in view of the above circumstances, and therefore an object of the present invention is to provide a technique by which the occurrence of a striped pattern extending along a width direction of a linear laser beam is restrained in the irradiation of the linear laser beam shown in FIG. 1B.

In order to achieve the above object, according to the present invention, there are provided the following techniques.

First Aspect of the Present Invention

In the optical system shown in FIG. 2, it is assumed that the configurations of the cylindrical lens group 203 and the cylindrical lens 205 for correcting the distribution of energy in the longitudinal direction of the linear laser beam are shaped into the configurations of a cylindrical lens group 1105 and a cylindrical lens 1106 shown in FIGS. 11A and 11B.

It is assumed that those configurations are parallelogram whose angles X and Y are not 90°. With this configuration, the distribution (refer to FIG. 6) of peaks of interference formed within the linear laser beam can be changed into the distribution shown in FIG. 12.

That linear laser beam can restrain the occurrence of stripes, since the positions of peaks of interference are not aligned in a straight line.

The cylindrical lens group 1105 shown in FIG. 11A is structured by the combination of a plurality of cylindrical lenses 1102. The cylindrical lens group 1105 has a solid configuration which is formed by a locus drawn when a sectional configuration 1101 of the cylindrical lens 1102 is moved in parallel to a predetermined direction exclusive of that section 1101.

The direction along which the predetermined sectional configuration 1101 is moved in parallel is equal to each other in the respective lenses of the cylindrical lens group shown in FIG. 11A The respective lenses of the cylindrical lens group shown in FIG. 11A may be combined with each other. This is because if being combined, a lens machining process is facilitated.

Also, the cylindrical lens shown in FIG. 11B has a solid configuration which is formed by a locus drawn when a sectional configuration 1103 is moved in parallel to a predetermined direction exclusive of that section 1103.

The sectional configuration 1101 and another sectional configuration 1103 are so shaped as to enable a parallel light ray in a two-dimensional space to be converged in one point.

The cylindrical lens group thus defined in FIG. 11A is called "parallelogram cylindrical lens group 1105" in the present specification.

The cylindrical lens group likewise defined in FIG. 11B is called "parallelogram cylindrical lens group 1106" in the present specification.

An angle formed between a plane including the sectional configuration 1101 and a direction of moving in parallel is defined as X. An angle formed between a plane including the sectional configuration 1103 and a direction of moving in parallel is defined as Y.

In the first aspect of the present invention, it is assumed that the angle X is equal to the angle Y.

The first aspect of the present invention is characterized by an optical system in which the respective cylindrical lenses 1102 and 1104 in FIGS. 11A and 11B are inserted in an optical path of laser beam, the plane including the above sectional configuration is in parallel with the progressive direction of the laser beam, the respective lines formed by the collection of the focusses of the respective cylindrical lenses 1102 in FIG. 11A are in parallel to each other, and the lines formed by the collection of the focusses of the respective cylindrical lenses 1102 and 1104 in FIGS. 11A and 11B are orthogonal to the progressive direction of the laser beam and cross to the plane including the above sectional configuration at an angle not 90°.

The optical system (beam homogenizer) related to the above first aspect of the present invention is designed such that the sectional configuration 1101 is orthogonal to the parallelogram 1102 indicated by an oblique line section in FIG. 11A Also, the optical system related to the first aspect of the present invention is designed such that the sectional configuration 1103 is orthogonal to the parallelogram 1104 indicated by an oblique line section in FIG. 11B.

The features of the parallelogram cylindrical lens used in the first aspect of the present invention can be stated by another expression as follows.

That is, one lens arbitrarily selected from the parallelogram cylindrical lenses used in the first aspect of the present invention is designed such that a plane made by the collection of the focusses formed when a parallel light is made incident from an arbitrary direction is orthogonal to the plane including the predetermined sectional configuration as defined in the above, and the predetermined sectional configuration and the predetermined direction as defined in the above form the angle Y, and the angle Y is equal to each other in the respective parallelogram cylindrical lens (in this example X=Y), and the angle Y is not a right angle.

Now, a reason why the distribution of energy shown in FIG. 12 is obtained will be described.

First, let us consider that a structure shown in FIG. 11 is applied to the optical system shown in FIG. 2. In this example, the cylindrical lens group 203 and the cylindrical lens 205 in FIG. 2 are replaced by a parallelogram lens shown in FIG. 11.

That is, the cylindrical lens group 203 is shaped as shown in FIG. 11A, and the cylindrical lens 205 is shaped as shown in FIG. 11B.

One arbitrary lens is selected from the cylindrical lens group 202, and let us consider the selected lens and a linear laser beam formed by the lens group exclusive of the cylindrical lens group 202.

The interference state of a plane onto which the linear laser beam is irradiated is shown in FIG. 13. In FIG. 13, interference stripes indicated by reference numeral 1301 occur.

The configuration of the linear laser beam becomes a parallelogram that reflects the configurations of the parallelogram cylindrical lens group 1105 and the parallelogram cylindrical lens 1106 as indicated by reference numeral 1302 in FIG. 13.

Of the cylindrical lens group 1105, interference stripes shown in FIG. 13 are obtained through an arbitrary lens, locations where beams are formed by the respective lenses are slight different from each other (the locations where the beams are formed is shifted in the longitudinal direction of the linear laser beam from each other).

This is because when a light flux produced by each lens of the cylindrical lens group 1105 is made incident to the parallelogram cylindrical lens 1106, its incident location is different from each other. When those beams are well superimposed on each other as shown in FIG. 14, the peaks of interference are dispersed within the beam to enable a beam 1401 to be produced which makes it difficult to make an interference stripe.

The beams shown in FIG. 13 are simply superimposed on each other, it is formed into a beam 1401, but in fact, interference occurs in the width direction of the beam so as to form a beam 1201 (FIG. 12).

Therefore, in order to superimpose the beams on each other as shown in FIG. 14, the following conditions must be satisfied.

First, an interval d of interference stripes which are formed by the optical system shown in FIG. 2 is defined. Then, a distance D between the respective centers of cylindrical lenses situated on both ends of the laser beam 1501 (refer to FIG. 15) incident to the cylindrical lens group 202 is defined.

Then, a width of one lens of the cylindrical lens 202 is W, the cylindrical lens group 1105 having an angle X defined by $|\tan X|=(D+W)/d$ (angle X defined in FIG. 11A) in FIG. 11 and the cylindrical lens 1106 may be used (in this case, X=Y).

With the angle thus selected, the interval of the inference stripes is made narrower than that in the conventional optical system (shown in FIG. 2), and the distribution of intensity of the interference stripes is more distributed within the beam.

In other words, the distribution of energy within the beam becomes more uniform. It is unnecessary that the angle X is defined strictly. This is because the interval d of the interference stripes is not strictly uniform.

In this example, if using the cylindrical lens group 1105 having the angle X defined by $|\tan X|=W/d$ and the cylindrical lens 1106, since a light flux that passes through each of the cylindrical lenses 202 are overlapped with each other while being shifted from each other by the interval d of the interference stripes, the advantages obtained by the present invention cannot be obtained.

Also, if the angle X is $nW/d=|\tan X|$ (n is an integer and $2 W \leq nW \leq D$), the peaks of interference are effectively dispersed within the beam. Also, the laser power is also effectively utilized. In case of $W/d>|\tan X|$, the length of beam is too shortened, thereby deteriorating a processing efficiency.

Therefore, the angle X must be defined within the limit of $W/d<|\tan X|$.

Also, the more effect can be expected by defining the angle X within the limit of $2 W/d \leq |\tan X| \leq (D+W)/d$. On the other hand, the peaks of interference are not sufficiently dispersed within the beam, when $|\tan X|>>, (D+W)/d$.

In this example, it is assumed that the cylindrical lens group 203 and the cylindrical lens group 205 are equal in focal length to each other. Also, it is assumed that the cylindrical lens group 205 and the cylindrical lens group 1106 are equal in focal length to each other. Since the interval d of the interference stripes formed by the optical system shown in FIG. 2 is not always constant, a mean value of those intervals is defined as d.

Second Aspect of the Present Invention

Attention is paid to a fact that the shape of the cylindrical lens 1106 (refer to FIG. 11) determines the configuration of the beam. In other words, attention is paid to a fact concluded from that the position of the beam formed on the left side is not changed even if the position of the cylindrical lens group 203 is changed anywhere on a plane of FIG. 24 with respect to the cylindrical lens 205 as shown in FIG. 24.

In this example, it has been experimented how the beam is when the cylindrical lens 205 in the optical system of FIG. 2 is replaced by a parallelogram cylindrical lens 1106 (refer to FIG. 11B) regulated by the first aspect of the present invention.

The result is that substantially the same effect as that of the optical system in the first aspect of the present invention was obtained. However, compared with the first aspect of the present invention, the appearance of interference within the beam got slightly irregular.

Also, the cylindrical lens 1106 related to the first aspect of the present invention in FIG. 11 is substituted for the element 203 of the optical system in FIG. 2, and its angle Y is fixed. Under those conditions, the cylindrical lens group 1105 is substituted for the element 205 of the optical system in FIG. 2, and its angle X is freely changed to conduct computer simulation.

As a result, it has been proved that the angle X of the cylindrical lens group 1105 is almost irrelevant to the interval of the interference stripes within the beam.

Also, it has been found that even if the distance between the cylindrical lens group 1105 and the parallelogram cylindrical lens 1106 is changed, the interval of the interference stripes within the beam is not almost changed.

Therefore, it can be concluded that each lens of the parallelogram cylindrical lens group 1105 may be shaped as shown in FIG. 17.

FIG. 17 is a three-dimensional plane view. The configuration of FIG. 17 will be described in more detail below.

The configuration can be expressed as a solid configuration obtained by a locus drawn by a two-dimensional virtual lens when the two-dimensional virtual lens that enables a two-dimensional parallel light beam having the same wavelength to be converged in one point is moved in parallel to a direction excluding the above two-dimensional plane.

Compared with the first aspect of the present invention, the distribution of the beam interference in the second aspect of the present invention gets irregular. In the second aspect of the present invention, what is superior to the first aspect of the present invention resides in that only the cylindrical lens 205 in the optical system shown in FIG. 2 may be replaced by the parallelogram cylindrical lens 1106.

In other words, it resides in that the distribution of the light interference can be distributed within the beam in a more simply changing manner. From the viewpoints of the costs and troublesomeness, the second aspect of the present invention is superior to the first aspect of the present invention.

Third Aspect of the Present Invention

The present inventors have studied the parallelogram cylindrical lens 1106 substituted for the element 205, which is shaped as shown in FIG. 18.

This structure is characterized in that:

(1) A line formed by the collection of the focal points and an orientation vector of an incident laser beam are not orthogonal to each other.

(2) A plane that includes a line containing a direction from which the sectional configuration 1103 is extended and a line formed by the collection of the focal points are orthogonal to the plane of the sectional configuration 1103.

(3) The angle Y is not a right angle.

In the present specification, the collection of the focal points is defined as the collection of the points in which parallel light emitted from the incident direction (optical path direction) of the laser beam are focussed.

In this case, a line including the collection of the focal points of the cylindrical lenses (in this case, a line) is transverse to the plane 1901 to be irradiated at one point 1902 as shown in FIG. 19. That is, the collection of the focal points is oblique with respect to the plane to be irradiated.

In such a case, an image formed on the plane to be irradiated by a laser beam that passes through the respective lenses of the cylindrical lens group 202 shown in FIG. 2 is shown in FIG. 20.

FIG. 20 shows an appearance of the interference within the beam. The parallelogram cylindrical lens 1801 is substituted for the element 205 in FIG. 2. In this arrangement, when the cylindrical lens group 203 is situated facially symmetrical with the parallelogram cylindrical lens 1801, peaks 2001 of interference occur on locations drawn by solid squares.

However, when the cylindrical lens group 203 is not situated on locations facially asymmetrical with the parallelogram cylindrical lens 1801, the peaks of interference are obliquely distributed as indicated by reference numeral 2002 in FIG. 20, and when those peaks are overlapped with each other, the peaks of interference are dispersed within the linear laser beam 2003 as in the first and second aspects of the present invention.

The excellent point of the third aspect of the present invention is as follows, in comparison with the first and second aspects of the present invention. The state of the interference within the beam can be changed by changing the relative position between the cylindrical lens group 203 and the parallelogram cylindrical lens 1801 as described above.

This enables the arrangement of the lenses where the interference stripes are most dispersed within the beam to be selected by merely slightly changing the arrangement of the optical system even if how a period of the interference stripes which are changed by the wavelength, intensity, etc., of a light incident to the optical system (intervals of the adjacent stripes) is changed.

Since in the optical systems according to the first and second aspects of the present invention, the angle Y depends on the intervals of the interference stripes, there is no compatibility of the light source that produces beams largely different in the intervals of the interference stripes. However, in case of the third aspect of the present invention, its applied range can be expanded.

However, in the optical system according to the third aspect of the present invention, the regularity of the distribution of interference within the beams is the same degree as or slight inferior to that of the optical system according to the second aspect of the present invention.

A parallelogram cylindrical lens group 1105 and the parallelogram cylindrical lens group 1106 without the limits given to the first to third aspects of the present invention may be used.

In this case, the dispersion of the peaks of interference within the beam can be expected so far as the combination shown in FIG. 2 is not selected.

There is the combination by which a beam having the features of the beams according to the second and third aspects of the present invention together is obtained. However, when the configuration of the parallelogram cylindrical lens 1106 is remarkably different from the configuration of the cylindrical lens 205, the sufficient length of the beam cannot be obtained which is not suitable to the present invention.

The peaks of interference of the laser beams formed through any one of the first to third aspect of the present invention are dispersed in distribution, but still exist within the beam.

There is the possibility that the arrangement of the optical system is slightly shifted, and the intensity of the laser energy within the beam is locally too high or low.

However, those interference stripes hardly appear if the linear beams are superimposed on the substrate while being shifted. On the other hand, since there is a case in which the interface stripes are highly emphasized depending on how to superimpose the linear beams on each other, the excellent effects are obtained by slightly changing the scanning pitch of the linear laser beam, or finely adjusting the scanning direction of the linear laser beam to adjust how to superimpose the linear laser beams on each other. In the case where the above fine adjustment is not successful, the arrangement of the optical system needs to be re-adjusted.

The fine adjustment of the scanning direction as described above will be described in more detail using FIG. 25. In this case, when a laser processing is conducted while the linear laser beam is scanned in a direction orthogonal to the linear direction of that beam and shifted within the plane by an angle y from a direction including a plane formed by the linear laser beams, an angle at which the interference stripes more effectively disappears can be found. The angle y is sufficiently with the limit of $|\tan y| \leq 0.1$.

Similarly, in case of the first to third aspects of the present invention, the angle Y is within the limit of $1.5 \leq |\tan Y| \leq 600$. More preferably, Y may be selected from the limit of $12 \leq |\tan Y| \leq 300$.

An example of the optical system resulting from simplifying the first to third aspects of the present invention will be described below. This simplification is to omit the division of the beam in the width direction thereof.

In other words, this example is an optical system in which the cylindrical lens group 202 and the cylindrical lens 204 are omitted from the structure shown in FIG. 2.

The interference stripes of the linear laser beam formed by such an optical system is identical with the interference stripes made by one arbitrary lens of the cylindrical lens group 202 because there is no division of the laser beam made by the cylindrical lens group 202. In other words, those interference stripes are shown in FIG. 13. In this optical system, the peaks 1301 of interference are not dispersed within the beam.

However, when the linear laser beams 1302 are superimposed on each other in a direction perpendicular to the linear direction of the linear beam (in a direction by which a processing efficiency becomes maximum), since they are superimposed on each other as shown in FIG. 21, the peaks of interference not are repeatedly superimposed on each other.

Therefore, the peaks of light interference within the linear beam are not emphasized so that the stripe pattern hardly appears. The advantage of this method resides in that the processing efficiency of the linear laser can be used substantially at the maximum in comparison with the method of FIG. 8.

A semiconductor film is annealed by a laser through the optical system defined in the first to third aspects of the present invention to form a polycrystal semiconductor film, and when a device such as a TFT liquid crystal display device is fabricated using that polycrystal semiconductor film, the dispersion of the characteristics of the respective TFTs is restrained, thereby being capable of obtaining an image with a high quality.

It is needless to say that the above polycrystal semiconductor film can be employed in manufacturing various integrated circuits other than the TFT liquid crystal display device.

Also, in manufacturing a structure called "system on panel (SOP)" where various integrated circuit is mounted on the same substrate as that of the TFT liquid crystal display device, it is useful to employ the present invention described in the present specification.

In other words, in the case where uniform laser annealing must be conducted on a relatively large area, the present invention described in the present specification is useful.

A first feature of the present invention described in the present invention is directed to a beam homogenizer made up of an optical system including a parallelogram cylindrical lens group that divides a light and a parallelogram cylindrical lens that re-couples the divided light.

In the present specification, the parallelogram is defined as a parallelogram with an angle formed by the adjacent sides being not a right angle.

The parallelogram cylindrical lens group that divides a light beam corresponds to the cylindrical lens group 203 shown in FIG. 2. Also, the parallelogram cylindrical lens group that re-couples the light beams divided corresponds to the cylindrical lens group 205 shown in FIG. 2.

A second feature of the present invention described in the present invention is directed to a beam homogenizer made up of a cylindrical lens group that divides a light beam; and a parallelogram cylindrical lens that re-couples the light beams divided by the parallelogram cylindrical lens group.

A third feature of the present invention described in the present invention is directed to a beam homogenizer made up of a parallelogram cylindrical lens formed by a locus resulting from moving a predetermined sectional configuration in parallel to a predetermined direction, wherein the sectional configuration can converge two-dimensional spacial parallel light beams having a specific wavelength in one point.

A fourth feature of the present invention described in the present invention is directed to a beam homogenizer made up of a cylindrical lens group that divides a light beam, and a parallelogram cylindrical lens formed by a locus resulting from moving a predetermined sectional configuration in parallel to a predetermined direction, wherein the sectional configuration can converge two-dimensional spacial parallel light beams having a specific wavelength in one point, and the parallelogram cylindrical lens re-couples the divided light.

A fifth feature of the present invention described in the present invention is directed to a beam homogenizer made up of a parallelogram cylindrical lens group that divides a light beam, and a parallelogram cylindrical lens formed by a locus resulting from moving a predetermined sectional configuration in parallel to a predetermined direction, wherein the sectional configuration can converge two-dimensional spacial parallel light beams having a specific wavelength in one point, and the parallelogram cylindrical lens re-couples the divided light.

A sixth feature of the present invention described in the present invention is directed to a beam homogenizer made up of a cylindrical lens group that divides a light beam, and a parallelogram cylindrical lens formed by a locus resulting from moving a predetermined sectional configuration in parallel to a predetermined direction, wherein the sectional configuration can converge two-dimensional spacial parallel light beams having a specific wavelength in one point, and the parallelogram cylindrical lens re-couples the divided light, the parallelogram cylindrical lens is shaped such that a plane made by the collection of focal points formed when the parallel lights are made mutually incident from an arbitrary direction is orthogonal to a plane including a predetermined sectional configuration defined in advance, and such that the predetermined sectional configuration and a predetermined direction defined in advance form an angle Y, and the angle Y is not a right angle.

A seventh feature of the present invention described in the present invention is directed to a beam homogenizer made up of a parallelogram cylindrical lens group that divides a light beam, and a parallelogram cylindrical lens formed by a locus resulting from moving a predetermined sectional configuration in parallel to a predetermined direction, wherein the sectional configuration can converge two-dimensional spacial parallel light beams having a specific wavelength in one point, and the parallelogram cylindrical lens re-couples the divided light, the parallelogram cylindrical lens is shaped such that a plane made by the collection of focal points formed when the parallel lights are made mutually incident from an arbitrary direction is orthogonal to a plane including a predetermined sectional configuration defined in advance, and such that the predetermined sectional configuration and a predetermined direction defined in advance form an angle Y, and the angle Y is not a right angle.

An eighth feature of the present invention described in the present invention is directed to a beam homogenizer made up of a parallelogram cylindrical lens group consisting of the combination of plural parallelogram first cylindrical lenses formed by a locus resulting from moving a predetermined sectional configuration in parallel to a predetermined direction, and a parallelogram second cylindrical lens having the same characteristic as that of the parallelogram first cylindrical lens, wherein the sectional configuration can converge two-dimensional spacial parallel light beams having a specific wavelength in one point, and one arbitrarily selected from the parallelogram first cylindrical lenses is shaped such that a plane made by the collection of focal points formed when the parallel lights are made mutually incident from an arbitrary direction is orthogonal to a plane including a predetermined sectional configuration defined in advance, and such that the predetermined sectional configuration and a predetermined direction defined in advance form an angle Y, and the angle Y is equal to each other in the respective parallelogram first cylindrical lenses, and said angle Y is not a right angle.

It is preferable that the angle Y according to the sixth to eighth aspect of the present invention is within the limit of $1.5 \leq |\tan Y| \leq 600$. It is more preferable that the angle Y is selected within the limit of $12 \leq |\tan Y| \leq 300$.

A ninth feature of the present invention described in the present invention is directed to a laser annealing device made up of means for generating a laser beam, lenses made up of a parallelogram first cylindrical lens group that unifies the distribution of energy of a linear laser beam in a linear direction thereof, which is a final processed configuration while enlarging the laser beams after being divided, and a parallelogram first cylindrical lens, a second cylindrical lens that converges the laser beams in a line, and a movable table that moves in one direction.

A tenth feature of the present invention described in the present invention is directed to a laser annealing device made up of means for generating a laser beam, lenses made up of a parallelogram first cylindrical lens group that unifies the distribution of energy of a linear laser beam in a linear direction thereof, which is a final processed configuration while enlarging the laser beams after being divided, and a parallelogram first cylindrical lens, lenses made up of a second cylindrical lens group that converges said laser beam in a line by re-coupling the laser beam which has been divided, and a parallelogram second cylindrical lens, and a movable table that moves in one direction.

An eleventh feature of the present invention described in the present invention is directed to a laser annealing device made up of means for generating a laser beam, lenses made up of a parallelogram first cylindrical lens group that unifies the distribution of energy of a linear laser beam in a linear direction thereof, which is a final processed configuration while enlarging the laser beams after being divided, and a parallelogram first cylindrical lens, a second cylindrical lens that converges the laser beams in a line, and a movable table variable in its moving direction.

A twelfth feature of the present invention described in the present invention is directed to a laser annealing device made up. of means for generating a laser beam, lenses made up of a parallelogram first cylindrical lens group that unifies the distribution of energy of a linear laser beam in a linear direction thereof, which is a final processed configuration while enlarging the laser beams after being. divided, and a parallelogram first cylindrical lens, lenses made up of a second cylindrical lens group that converges said laser beam in a line by re-coupling the laser beam which has been divided, and a parallelogram second cylindrical lens, and a movable table variable in its moving direction.

The laser beam used in the present invention described above is preferably an excimer layer.

A thirteenth feature of the present invention described in the present invention is directed to a laser processing method for a semiconductor device made up of the steps of irradiating a linear laser beam onto a substrate on which a semiconductor film is formed while scanning the linear laser beam, including the steps of processing the laser beam into a linear laser beam while unifying the distribution of energy by a beam homogenizer including a parallelogram cylindrical lens, and processing the linear laser beam in a scanning manner.

A fourteenth feature of the present invention described in the present invention is directed to a laser processing method for a semiconductor device made up of the steps of irradiating a linear laser beam onto a substrate on which a semiconductor film is formed while scanning the linear laser beam, including the steps of processing the laser beam into a linear laser beam while unifying the distribution of energy by a beam homogenizer including a parallelogram cylindrical lens, and processing said linear laser beam while scanning the linear laser beam in a direction orthogonal to the linear direction of the beam and shifted from a direction including a plane on which the linear laser beam is formed by an angle y within said plane, wherein the angle y is within the limit of $|\tan y| \leq 0.1$.

The laser beam used in the thirteenth and fourteenth aspects of the present invention is preferably an excimer layer.

A fifteenth aspect of the present invention is a semiconductor device manufactured by using a semiconductor film which has been annealed by a laser beam through the parallelogram cylindrical lens.

According to the present invention, a non-monocrystal semiconductor film is annealed by using a laser anneal resulting from re-constructing a laser beam which has been divided and processing it into a linear beam to crystallize or improve crystallinity, the periodic non-uniformity of the energy caused by light interference formed within the linear laser beam is prevented from reflecting the non-monocrystal semiconductor film.

For example, the energy of the linear laser beam formed by the optical system shown in FIG. 2 exhibits the periodic repeat of the intensity of the energy in its linear width direction.

When the linear laser beams having the above energy distribution is scanned and irradiated on the semiconductor film while they are superimposed on each other in a direction perpendicular to the linear direction of the linear laser, the distribution of the energy within the linear laser beam is caused to be emphasized within the film.

In the present invention, the distribution of interference within the linear laser beam is more dispersed by using a beam homogenizer which is shaped in a parallelogram whose angles are not a right angle than the conventional one.

Alternatively, the distribution of interference within the linear laser beam is more changed by using a beam homogenizer according to the present invention than the conventional one, so that the maximum portion or the minimum portion of the energy within the beam is prevented from being repeatedly applied to the same portion of the semiconductor film.

With the above structure, the energy distribution within the linear laser beam is dispersed within the semiconductor film, thereby being capable of more uniformly conducting laser annealing.

DETAILED DESCRIPTION OF THE PREFERRED EMBODIMENTS

Embodiment 1

Figure 1A:
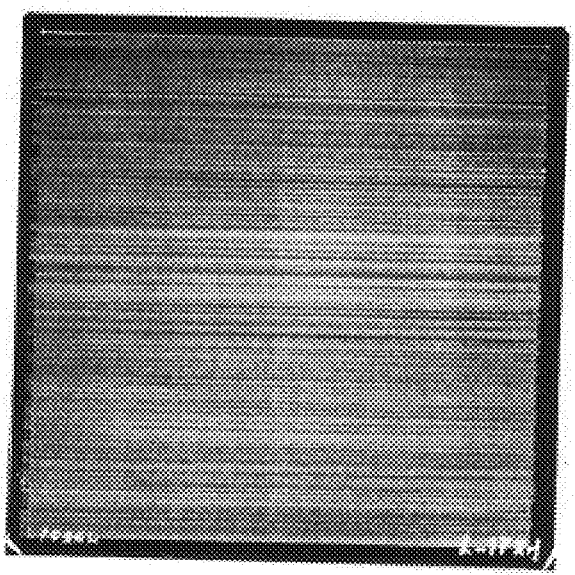
FIGS. 1A and 1B are pictures showing a silicon film crystallized by a linear laser.
Figure 1B:
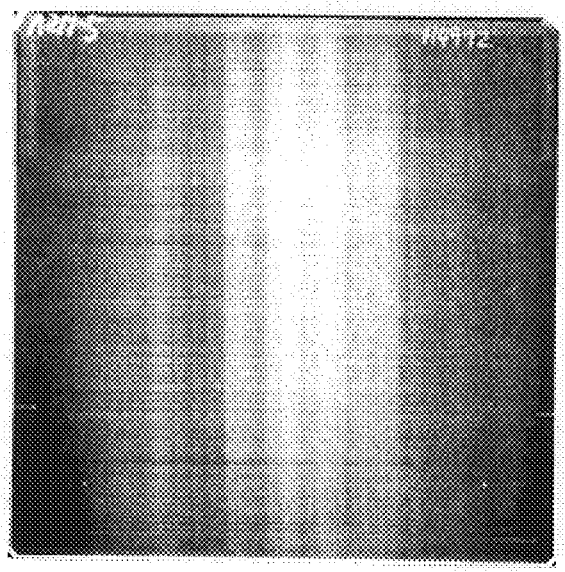

In a manufacturing process of this embodiment, there is first described a method of manufacturing a semiconductor film on which a laser beam is irradiated. There are three kinds of semiconductor films on which a laser beam is irradiated in the present specification. The present invention is effective to any semiconductor films.

First, any one of three kinds of semiconductor films is formed in such a manner that a silicon oxide film functioning as a base film is formed in thickness of 2000 Å on a corning 1737 glass substrate (or other glass substrates) 127 mm square as a substrate, and an amorphous silicon film is formed in thickness of 500 Å thereon. They are continuously formed through the plasma CVD method. The amorphous silicon film is called "a starting film" below.

(Procedure of Manufacturing a Semiconductor Film A)

The starting film is heated at 450° C. for one hour. This process is a process for reducing the concentration of hydrogen in an amorphous silicon film. When hydrogen in the film is too much, since the film cannot withstand a laser energy, this process is required.

The density of hydrogen within the film is appropriately $10^{20}$ atoms/cm$^3$ order. This film is called "a non-monocrystal silicon film A".

(Procedure of Manufacturing a Semiconductor Film B)

Nickel acetate aqueous solution of 10 ppm is formed on the starting film through the spin coating method, as a result of which a nickel acetate layer is formed on the starting film. It is more preferable that an interfacial active agent is added to the nickel acetate aqueous solution. Since the nickel acetate layer is very thin, it leads to no problem although it is not always in the form of a film.

Subsequently, a heat annealing is conducted on the substrate on which the respective films are laminated as in the above manner at 600° C. for 4 hours. As a result, the amorphous silicon film is crystallized to form a crystalline silicon film B which is a non-monocrystal silicon film.

In this situation, nickel which is a catalytic element serves as nuclei of crystal growth to promote crystallization. That crystallization can be conducted at a low temperature for a short period of time, such as at 600° C. for 4 hours is because of the function of nickel. The details are disclosed in Japanese Patent Application Laid-open No. Hei 6-244104.

The concentration of the catalytic elements is preferably $1 \times 10^{15}$ to $1 \times 10^{19}$ atoms/cm$^3$. In case of the high concentration of $1 \times 10^{19}$ atoms/cm$^3$ or more, a metallic property is exhibited in the crystalline silicon film, whereby the characteristic of the semiconductor disappears.

In this embodiment, the concentration of the catalytic elements in the crystalline silicon film is $1 \times 10^{17}$ to $5 \times 10^{18}$ atoms/cm$^3$. Those values are obtained by analyzing and measuring the secondary ion mass spectroscopy (SIMS).

(Procedure of Manufacturing a Semiconductor Film C)

A silicon oxide film is further formed on the starting film in thickness of 700 Å. The film forming method is a plasma CVD. Then, an opening is completely formed in a part of the silicon oxide film through a photolitho-patterning. Moreover, in order to form the thin oxide film in the opening portion, a UV ray is irradiated onto the opening portion under an oxygen atmosphere for 5 minutes. The thin oxide film is formed in order to improve the wettability of the opening portion with respect to a nickel aqueous solution which will be introduced later.

Then, the nickel acetate aqueous solution of 100 ppm is coated on the film through the spin coating method. As a result, nickel acetate is formed on the opening portion. It is more preferable that an interfacial active agent is added to the nickel acetate aqueous solution.

Thereafter, heat annealing is conducted on the substrate at 600° C. for 8 hours, as a result of which crystal grows in parallel with the substrate (lateral direction) from the nickel introduced portion. In this situation, nickel serves as crystal nuclei in the film B. A lateral growth distance is about 40 μm under the above conditions. Thus, the amorphous silicon film is crystallized to form a crystalline silicon film which is a non-monocrystal silicon film. Thereafter, the silicon oxide film on the crystalline silicon film is peeled off and removed using a buffer hydrofluoric acid.

In this way, the non-monocrystal silicon films A, B and C are obtained. Moreover, in order to further enhance crystallinity, a laser annealing is conducted using an excimer laser.

Figure 9:
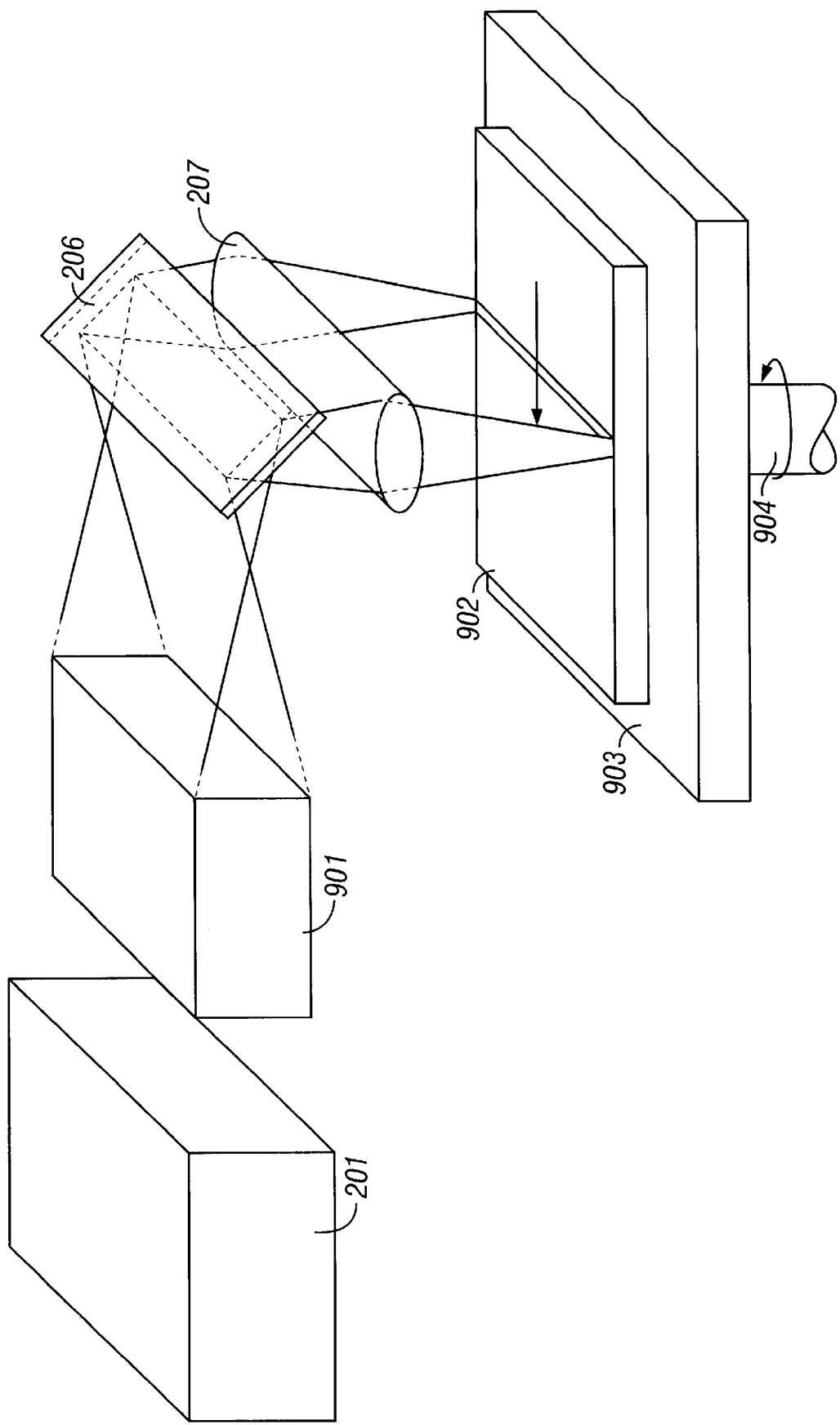
FIG. 9 is a diagram showing a laser irradiation system in the embodiment.

FIG. 9 shows a laser irradiation system in this embodiment. FIG. 9 is a schematic view of the laser irradiation system.

In FIG. 9, the laser irradiation system functions to allow a pulse laser beam which is emitted from a laser oscillation device 201 and processed into a line in sectional configuration by an optical system 901 to be reflected by a mirror 206, converged by a cylindrical lens 207 and irradiated onto a substrate 902 to be processed.

Figure 2:
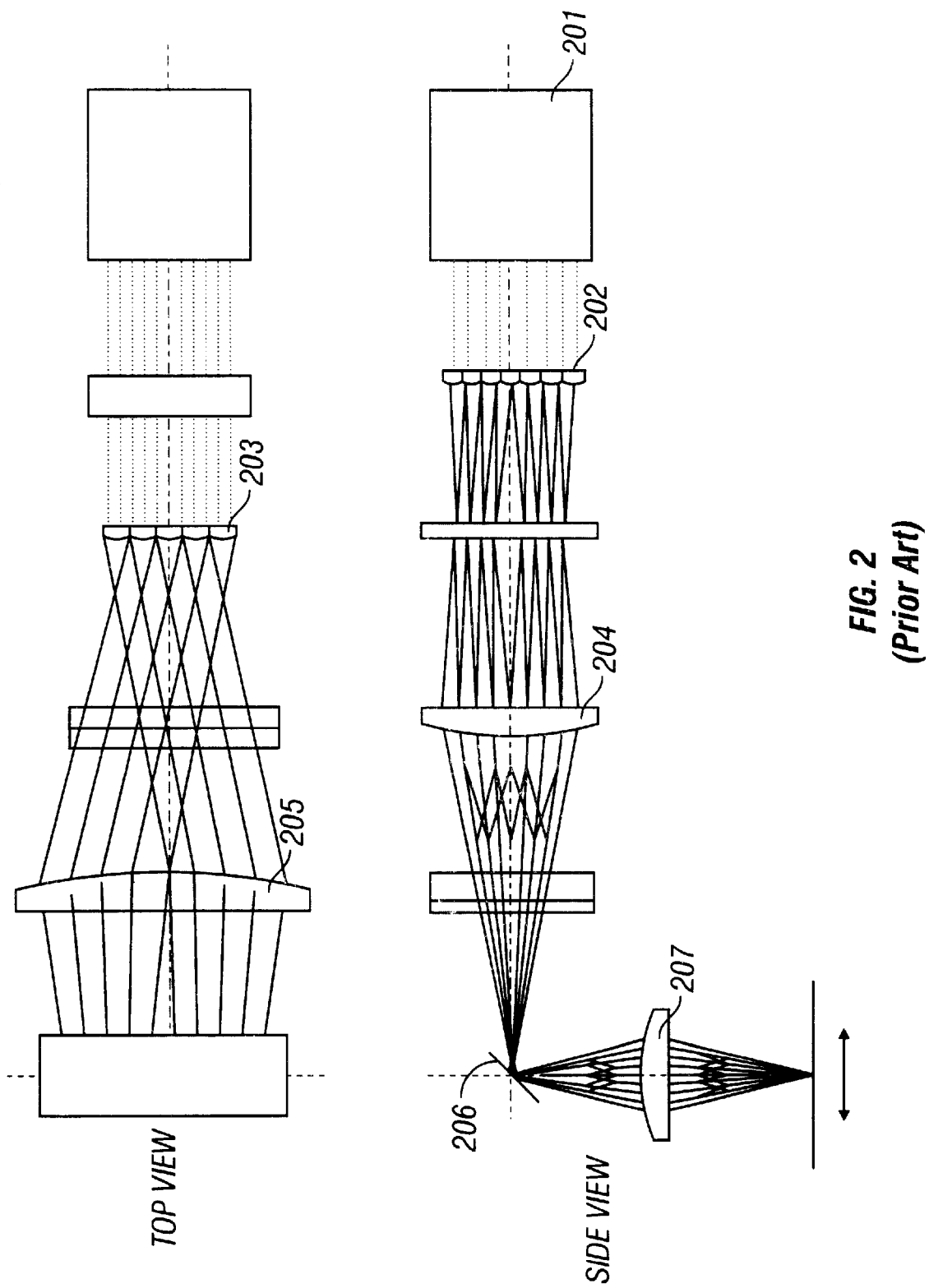
FIG. 2 is a diagram showing the outline of a laser irradiating apparatus.
Figure 3:
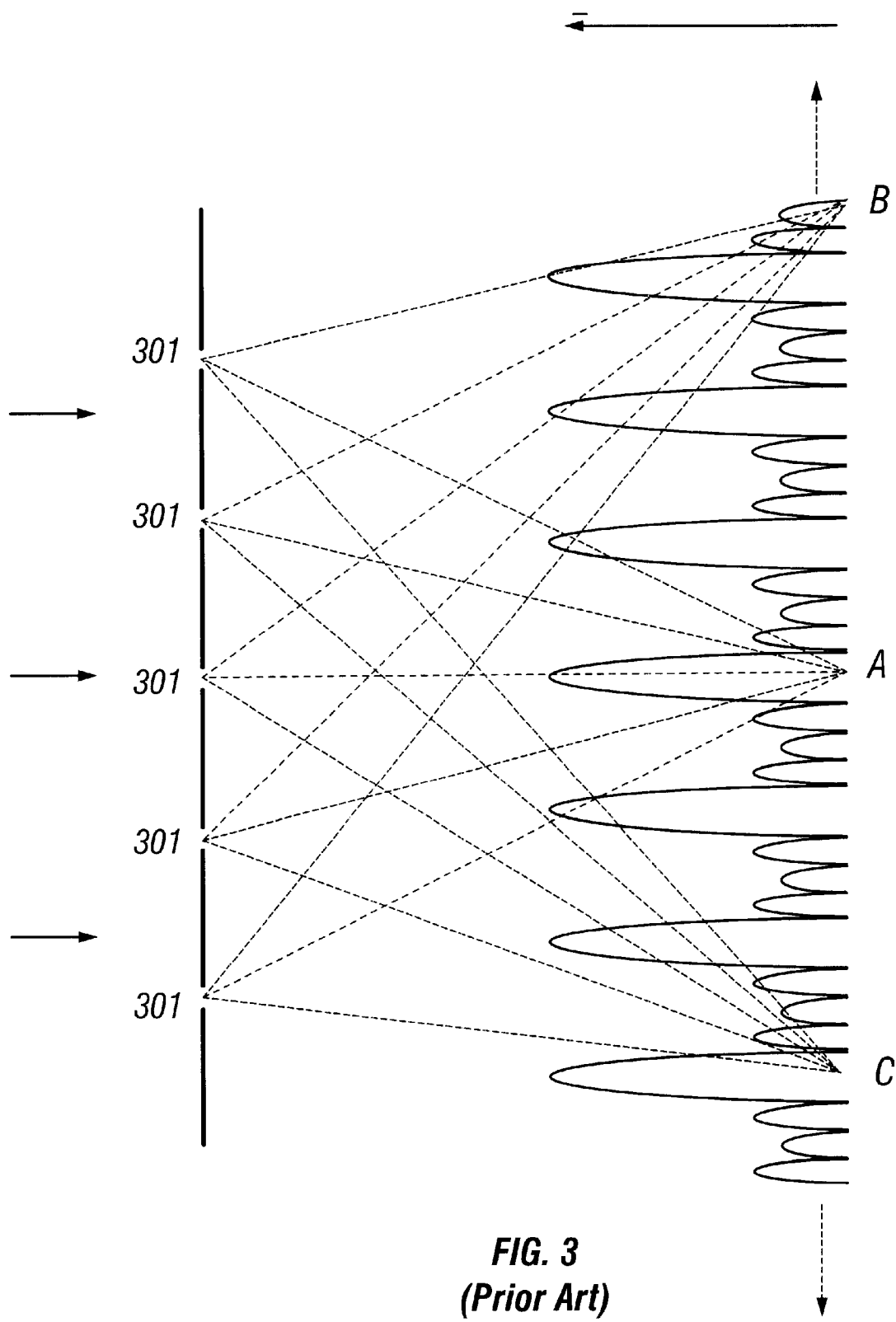
FIG. 3 is a diagram showing a principle of a light interference.

The optical system 901, the mirror 206 and the cylindrical lens 207 are shown in FIG. 2. Of the lenses shown in FIG. 2, the cylindrical lens group 203 is replaced by the parallelogram cylindrical lens group 1105. Also, the cylindrical lens group 205 is replaced by the parallelogram cylindrical lens 1106.

The parallelogram cylindrical lens group 1105 and the parallelogram cylindrical lens 1106 have the configuration according to the first aspect of the present invention, and its angle X is 88°.

Here, a method of determining the angle X will be described. The interference stripes produced by the optical system shown in FIG. 2 are 0.2 mm in pitch which corresponds to d defined by the above description. Also, D and W defined in the above description are 12 mm and 3 mm, respectively.

As described above, since the angle X calculated by $|\tan X|=(nW)/d(n\geq 2)$) is an angle by which the peaks of interference can be most dispersed within the linear laser beam, the respective values of d and W are substituted in the above expression. In this embodiment, n=2.

The reason why the optical system shown in FIG. 2 is used is that the beam configuration can be processed into a linear beam while the unevenness of energy of the beam before it is made incident to the optical system is superimposed on each other after being divided, to thereby average the unevenness of the energy.

The linear laser beam used in the present invention complies with the optical system shown in FIG. 2. The function of the lenses of the type shown in FIG. 2 will be described below.

The cylindrical lens groups 202 and 1105 are arranged to divide the beam in the width direction and longitudinal direction. The cylindrical lenses 204 and 1106 are arranged to converge the divided light beams in one region, in the present invention, in a linear region. In this embodiment, since an original beam is divided widthwise into four and longitudinally into seven, 28-divided beams are converged into one to average the energy distribution of the beam. Although the ratio of the width length of the beam to the longitudinal length thereof is variable structurally of the lens group, the beam shape which is easy to form is limited by the combination of the size of the lens and the focal distance. In the optical system according to this embodiment, the length of a longer side of the beam cannot be varied.

Figure 4:
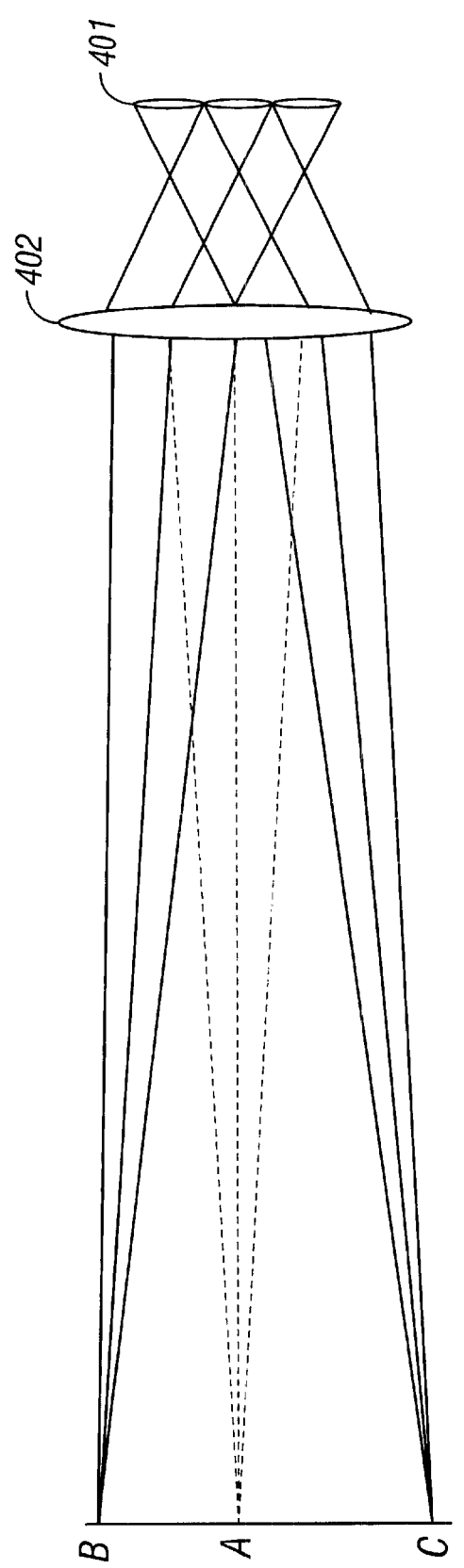
FIG. 4 is a diagram showing an optical path when a beam is divided and re-coupled through an optical system that forms a linear laser.
Figure 5:
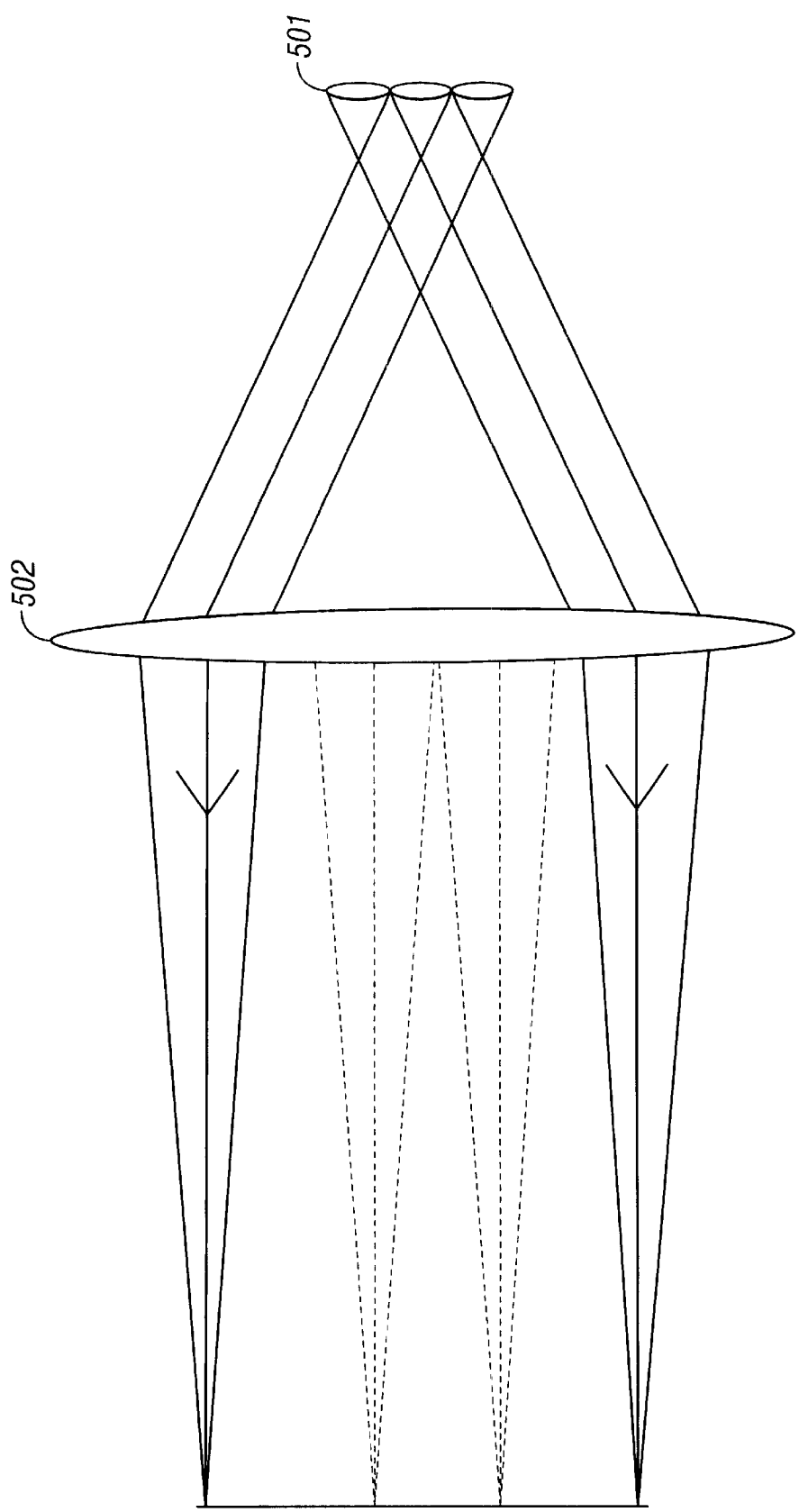
FIG. 5 is a diagram showing an optical path when a beam is divided and re-coupled through an optical system that forms a linear laser.
Figure 6:
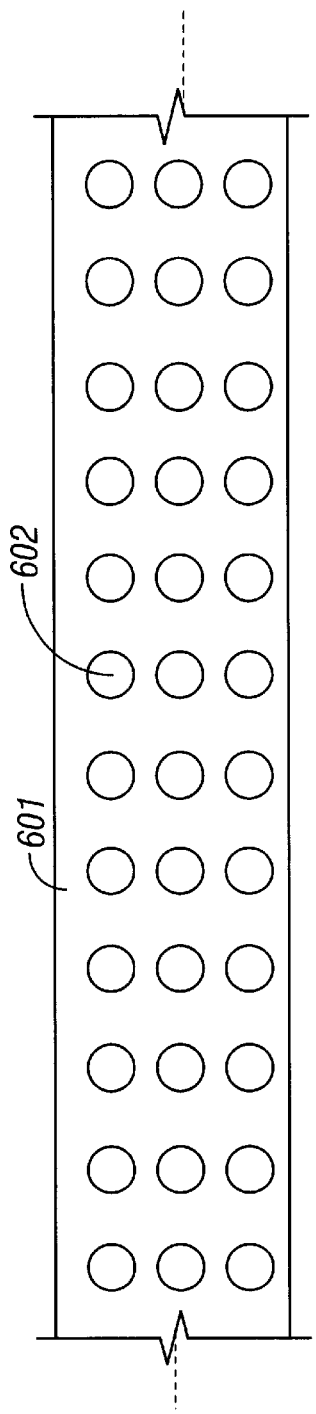
FIG. 6 is a diagram showing the peaks of interference on a plane on which a linear laser beam is irradiated.
Figure 12:
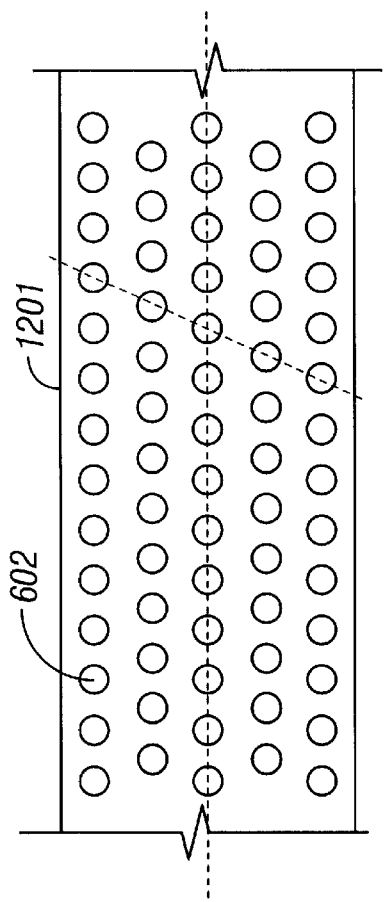
FIG. 12 is a diagram showing an appearance of the light interference within the linear laser beam which has been processed through the optical system using the parallelogram cylindrical lens.
Figure 7:
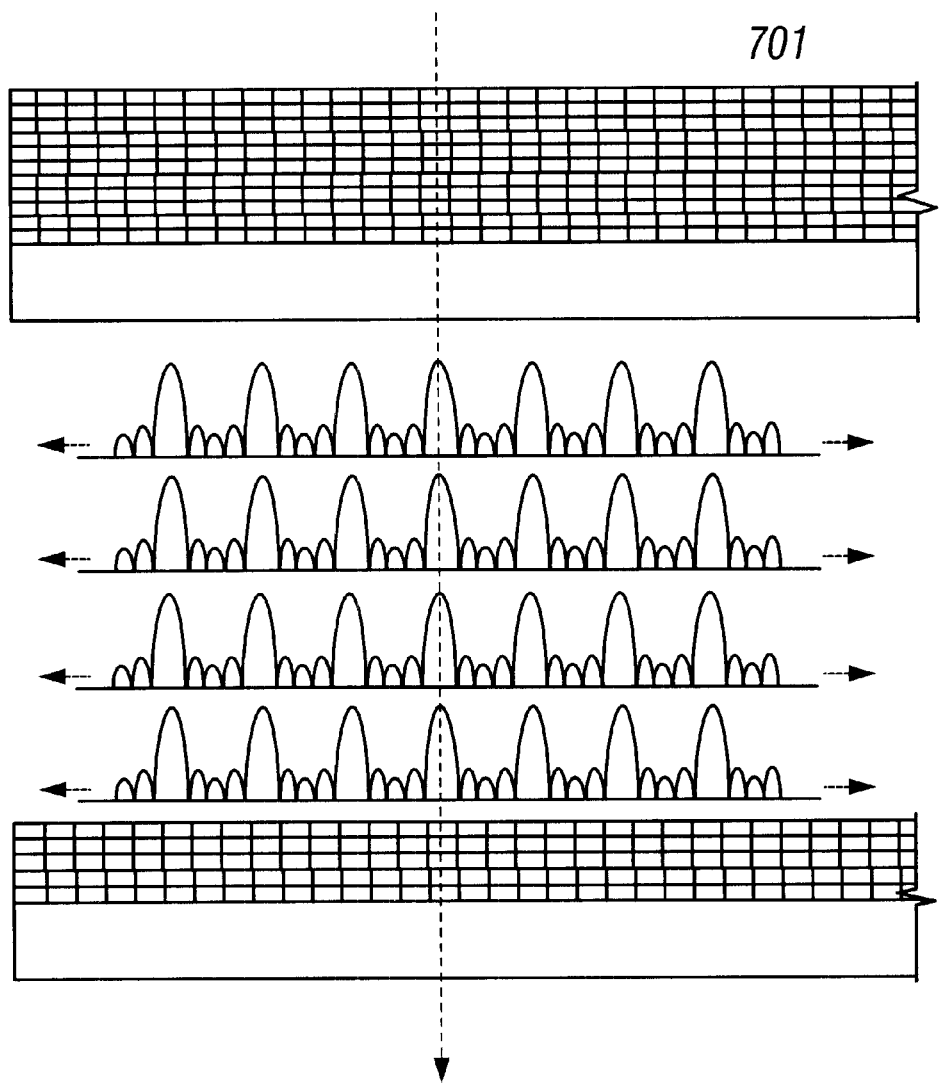
FIG. 7 is a diagram showing an appearance of the laser irradiation that emphasizes the light interference.

In this embodiment, the effect is exhibited even using the lenses arranged as shown in FIG. 4 or 5. Although the cylindrical lens groups 202 and 1105 are convex lenses, the essence of the present invention is adversely affected by using of concave lenses or lenses mixing the convex and concave lenses. Or, the size of lenses may be different in both of the convex lenses and the concave lenses.

Figure 11A:
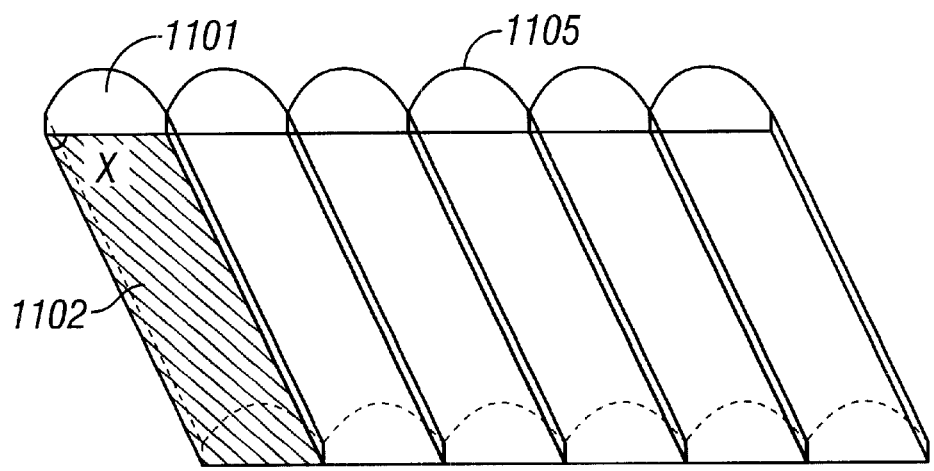
FIGS. 11A and 11B are structural diagrams showing a parallelogram cylindrical lens.
Figure 11B:
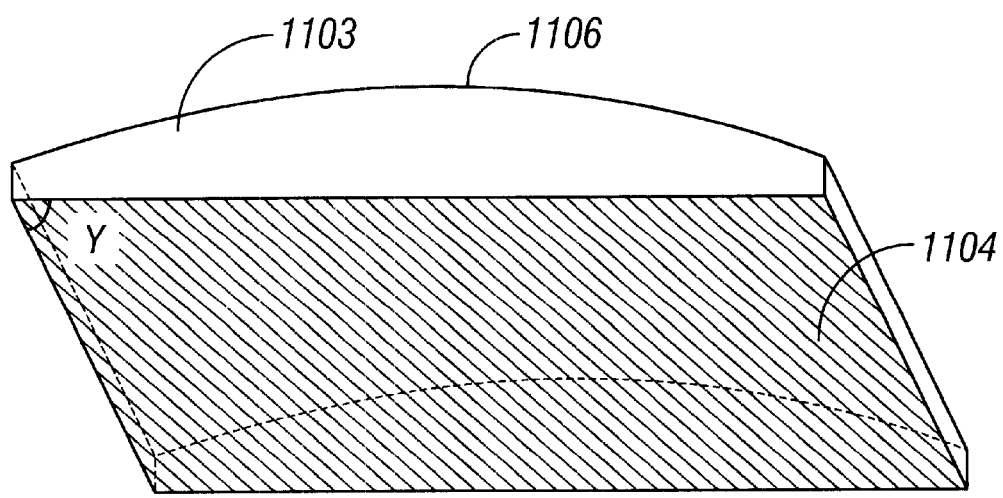
Figure 22:
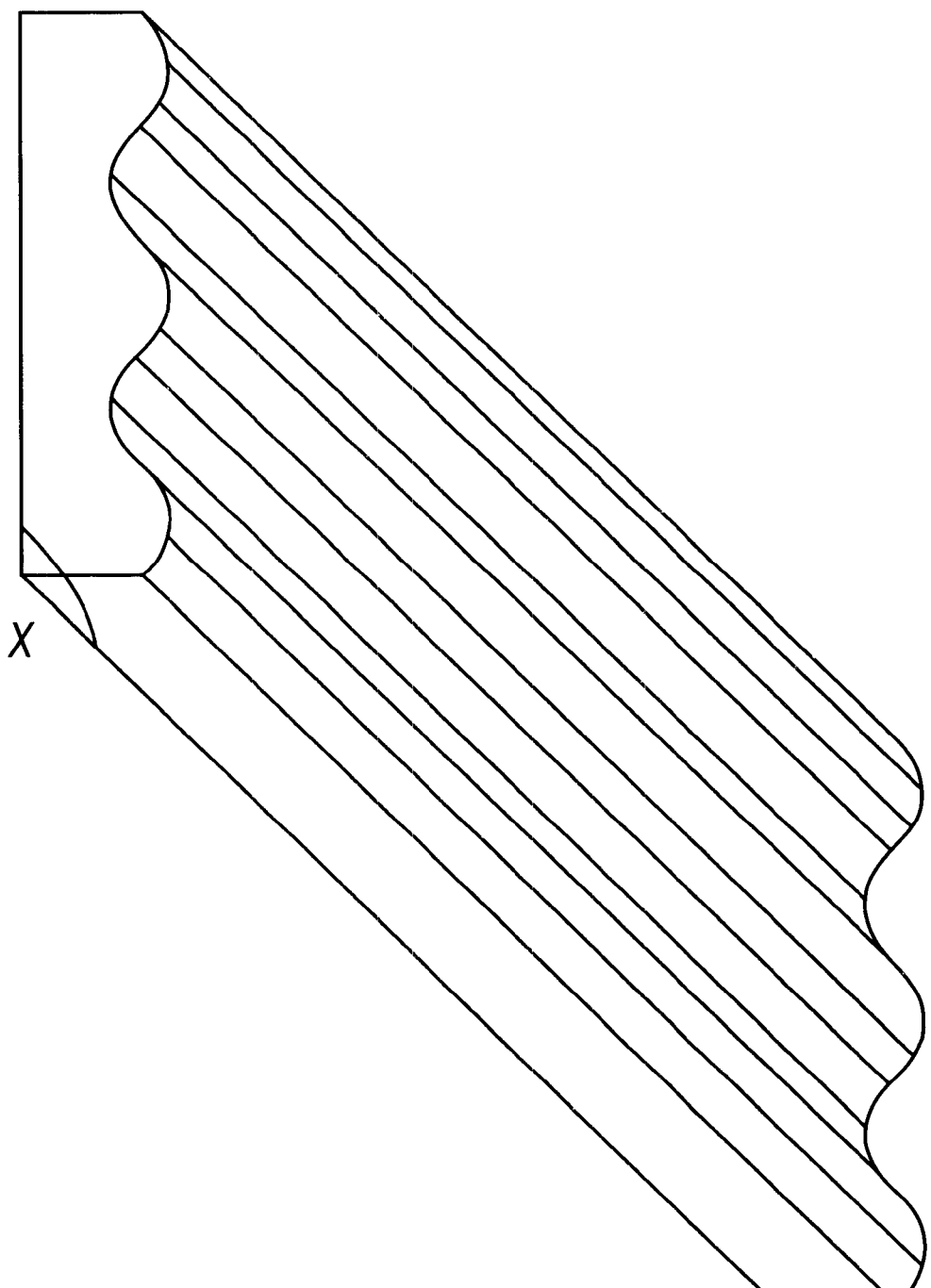
FIG. 22 is a diagram showing an example of the concave/convex mixture cylindrical lenses.

When the cylindrical lens group 1105 shown in FIG. 11 is replaced by the concave/convex mixture lens group having the same function, the resultant structure is shown in FIG. 22.

However, in the case where the lenses that do not amalgamate with each other as represented by the concave/convex mixture lens group are used, they must be constituted by lenses which are identical with each other in the angle of the expansion the parallel light rays processed by the lenses after being processed.

If not, when the divided beams are re-coupled with each other, the respective beams are superimposed on each other with different sizes and shapes, thereby making the outline of the beams unclear.

In this example, the laser oscillation device 201 is adopted to oscillate the XeCl excimer laser (308 nm in wavelength). Alternatively, KrF excimer laser (248 nm in wavelength) and so on may be used.

Further, as shown in FIG. 9, a substrate 902 to be processed is disposed on a stage 903. Then, the stage 903 is straightly traveled in a direction perpendicular to the longitudinal direction of the linear laser beam, that is, in the width direction of the beam (including a flat surface having the linear laser beam) by a moving mechanism 1007, thereby enabling the laser beam to be irradiated on a top surface of the substrate 902 to be processed while it is being scanned.

Figure 10:
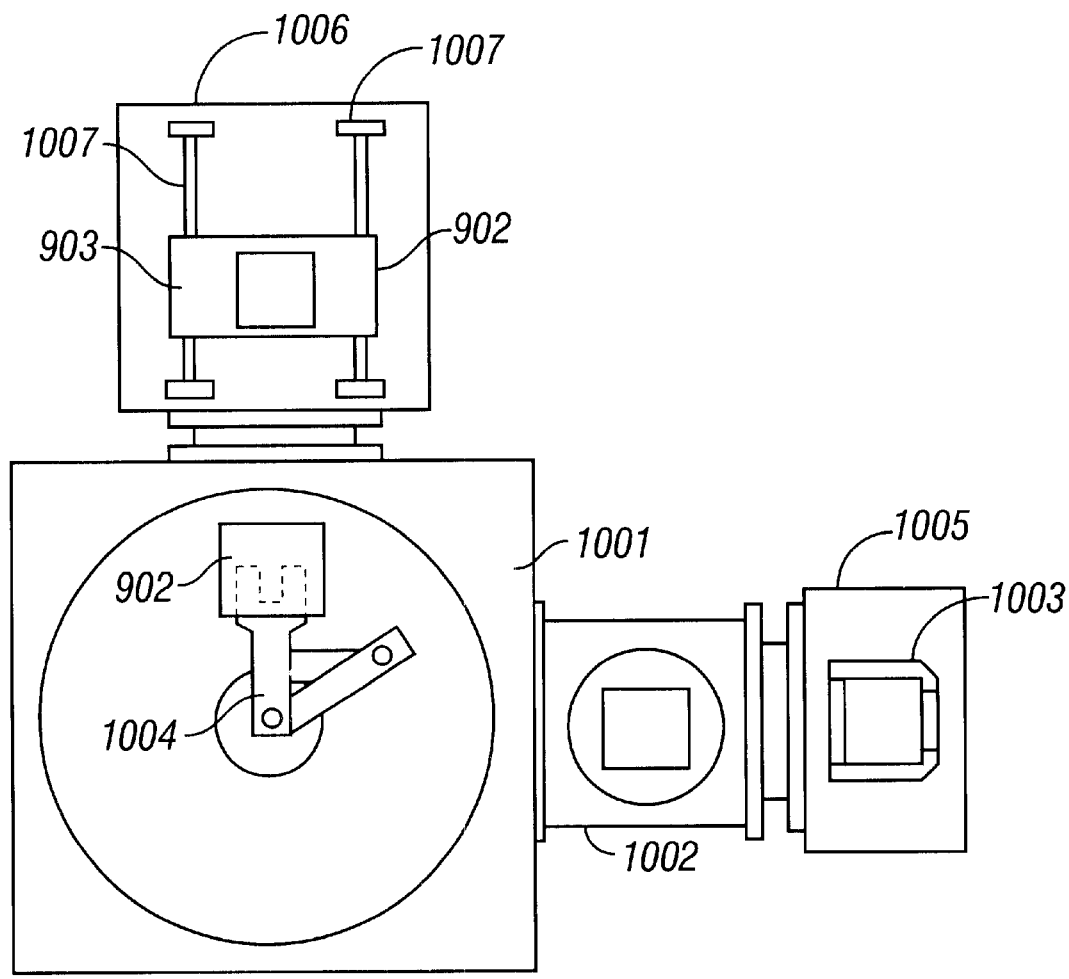
FIG. 10 is a top view showing a laser annealing device in the embodiment.

The device shown in FIG. 10 will be described. A cassette 1003 in which a large number of substrates 902 to be processed, for example, 20 pieces of substrates 902 are accommodated is disposed in a load/unload chamber 1005. One substrate is moved from the cassette 1003 to an alignment chamber 1002 by a robot arm 1005.

In the alignment chamber 1002 is disposed an alignment mechanism for correcting the positional relation between the substrate 902 to be processed and the robot arm 1004. The alignment chamber 1002 is connected to the load/unload chamber 1005.

The substrate is carried to a substrate carrier chamber 1001 by the robot arm 1004, and further transferred to a laser irradiation chamber 1006 by the robot arm 1004.

In FIG. 9, it is assumed that the linear laser beam irradiated onto the substrate 902 to be processed is 0.4 mm in width×135 mm in length. This beam is formed by the arrangement of the lenses shown in FIG. 5. The density of energy of the laser beam on a plane to be irradiated is set to, for example, 300 mJ/cm$^2$ within the limit of 100 to 500 mJ/cm$^2$.

The stage 903 is moved in one direction at a rate of 1.2 mm/s to scan the linear laser beam.

The oscillation frequency of the laser is set to 30 Hz, and attention is paid to one point of an object to be irradiated. Then, a laser beam of 10 shots is irradiated thereon. The number of shots is appropriately selected from the range of 5 to 50 shots.

After the laser irradiation has been completed, the substrate 902 to be processed is returned to the substrate carrier chamber 1002 by the robot arm 1004.

The substrate 902 to be processed is transferred to the load/unload chamber 1005 by the robot arm 1004 and then accommodated in the cassette 1003.

Thus, the laser annealing process is completed. In this way, the above process is repeated so that a large number of substrates can be sequentially processed one by one.

Although this embodiment uses the linear laser, even if any beam configurations including the linear configuration and the square configuration are used in the present invention, the effect of the present invention is obtained. Also, in this embodiment, if the parallelogram cylindrical lens 1106 is used, even if the conventional rectangular cylindrical lens group 203 is substituted for the parallelogram cylindrical lens group 1105, the effect of the present invention is obtained.

If a TFT having the semiconductor film annealed by the laser as described above as an active layer is manufactured, any n-channel type and p-channel type can be manufactured. Also, the structure combining the n-channel and the p-channel type TFTs can be also obtained.

Further, an electronic circuit can be structured by integrating a large number of TFTs. The above description is applicable to a semiconductor film which is annealed by a laser through the optical system described in other embodiments. In the case where a liquid crystal display device made up of TFTs is manufactured using the semiconductor film which is annealed by a laser through the optical system of the present invention, a high-quality image can be obtained which is reduced in the dispersion of the respective TFT characteristics.

Embodiment 2

In Embodiment 1, in the case where the stripe pattern does not well disappear, the arrangement of the optical system is improper, the intervals of the superimposition of the linear laser beams are improper, or the angle Y of the parallelogram cylindrical lens 1106 is improper.

In fact, at a stage of designing the optical system, if the arrangement of the peaks of interference is calculated so that an angle appropriate to the condition is obtained, the parallelogram cylindrical lens 1106 must be manufactured in the order made.

This leads to a very expensive lens. If the angle Y is improper, the peaks of interference are not sufficiently dispersed within the linear laser beam as described above.

Figure 8:
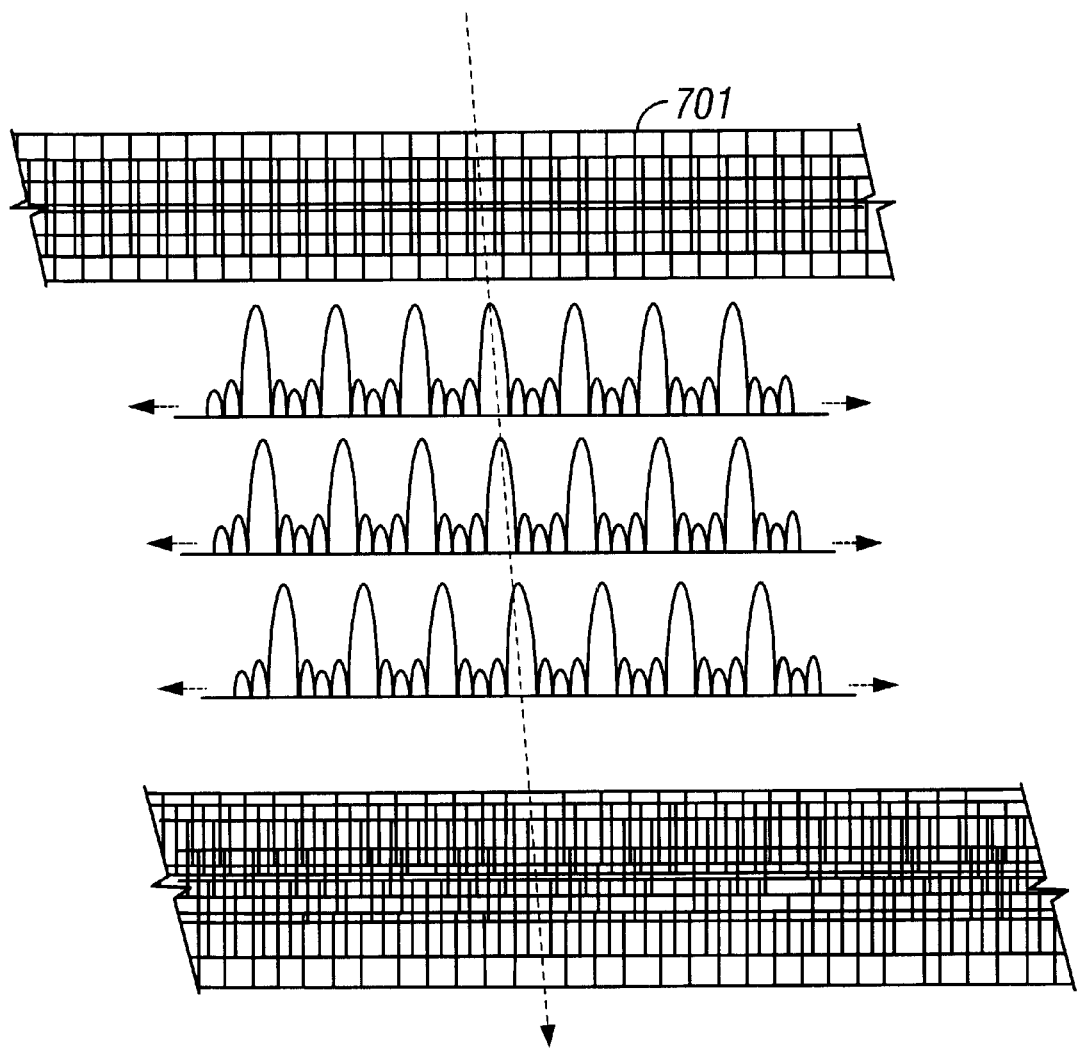
FIG. 8 is a diagram showing an appearance of the laser irradiation that makes the light interfere.

Therefore, this defect is compensated by a method of determining the scanning direction as shown in FIG. 8.

Figure 23:
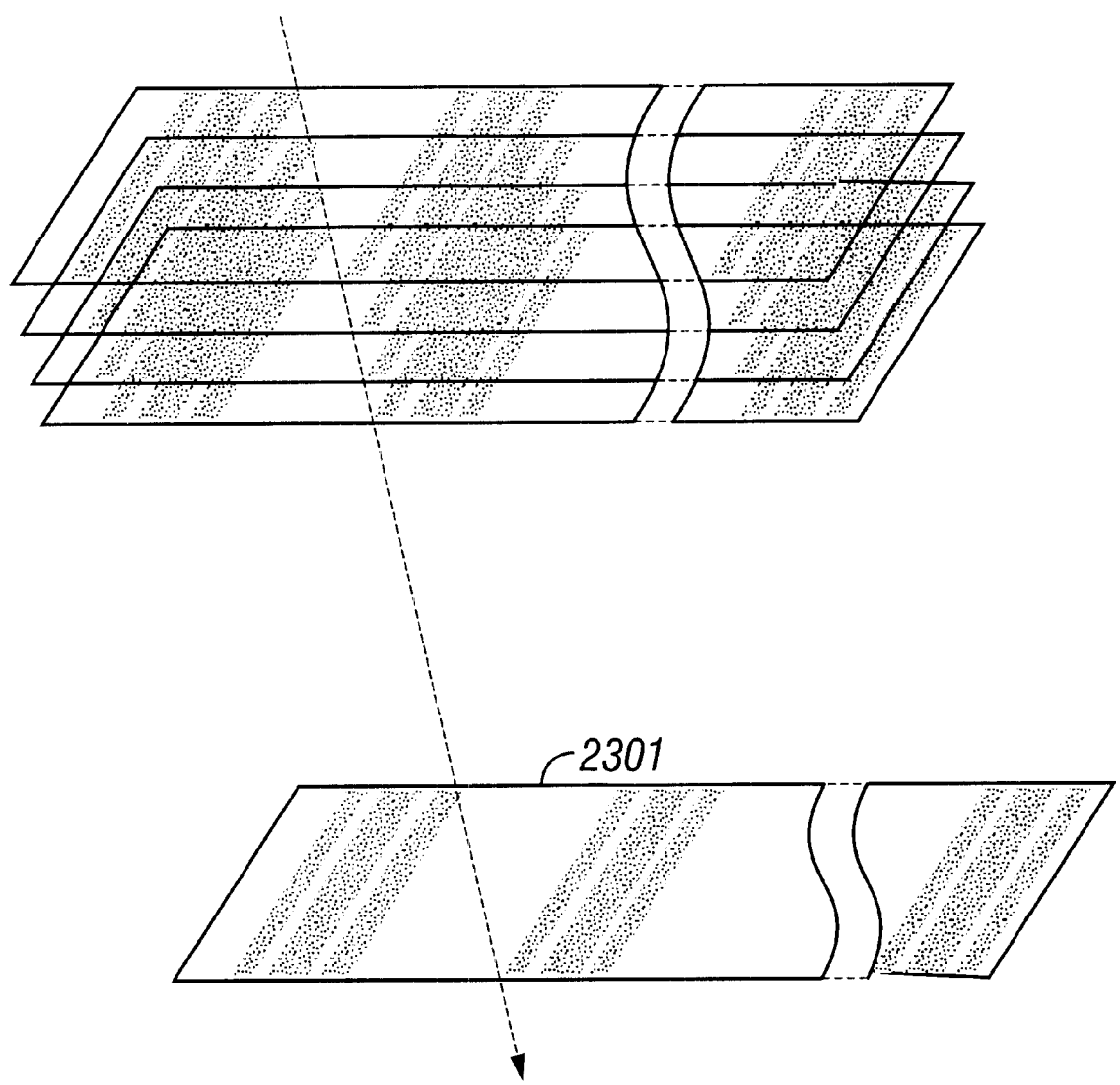
FIG. 23 is a diagram showing the scanning direction of a laser beam making the light interference most unobtrusive, which is changed according to the appearance of the light interference within the linear laser beam which has been processed through the optical system using the parallelogram lens group.
Figure 24:
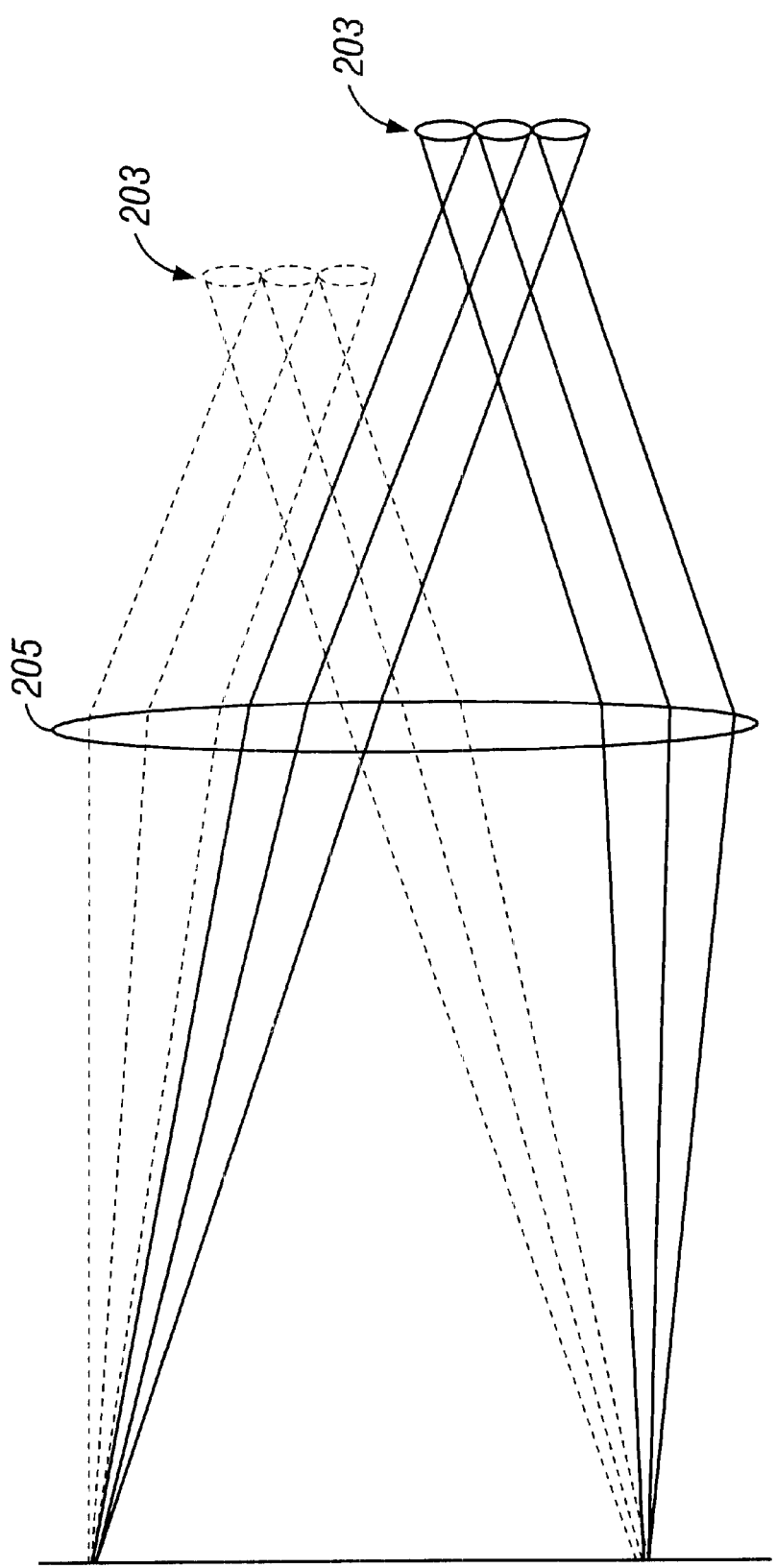
FIG. 24 is a diagram showing a change of an optical path according to the arrangement of the cylindrical lens.

In other words, in the case where the arrangement of the peaks of interference made by the beam homogenizer including the parallelogram cylindrical lens 1106 is like the linear laser beam 2301 which is insufficient for the dispersion of the peaks of interference, if the scanning direction of the substrate is finely adjusted by a scanning direction changing device 904 (FIG. 9) to change the scanning direction of FIG. 23 to a direction indicated by an arrow, the peaks of interference are more uniformly dispersed on the substrate.

Embodiment 3

Figure 16:
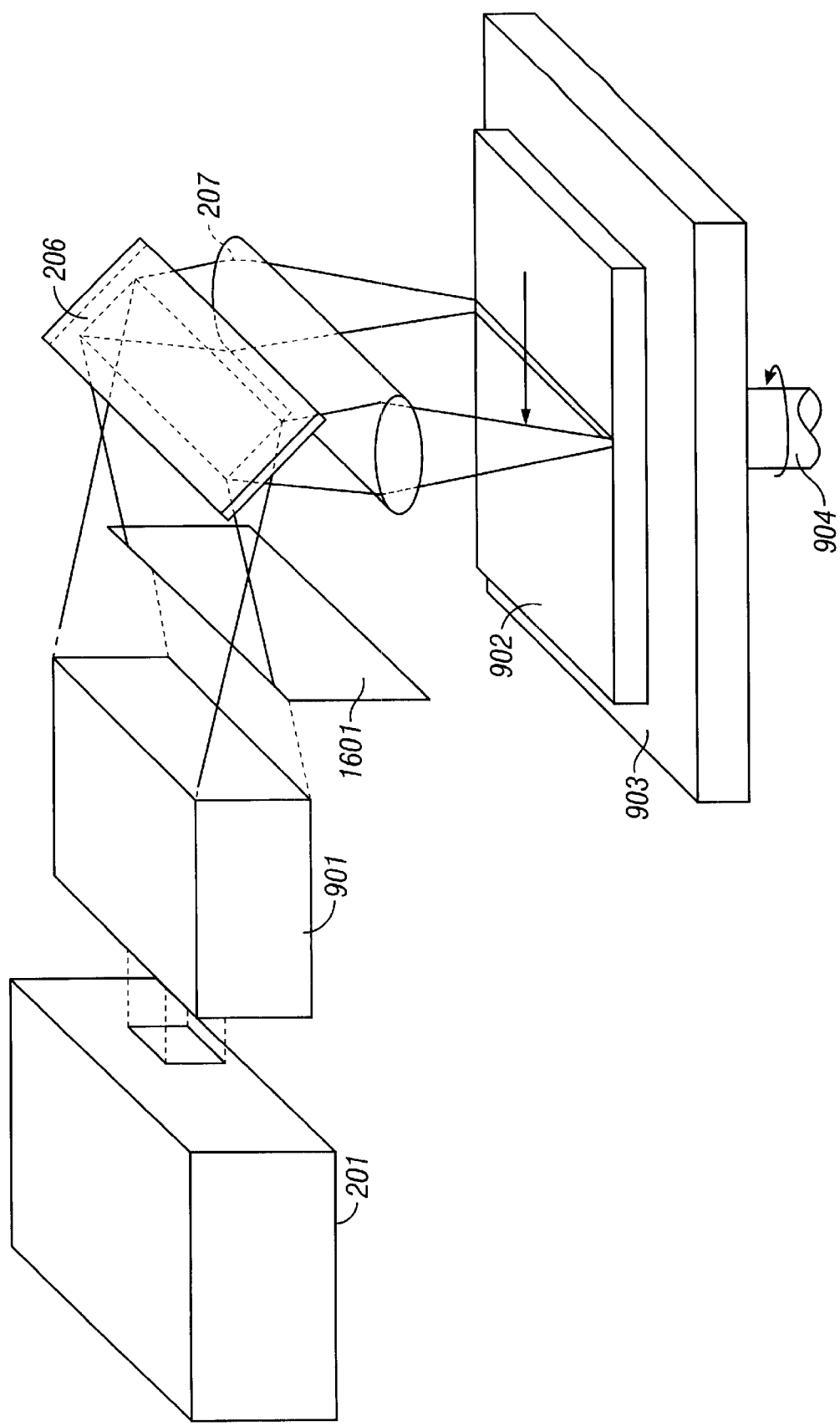
FIG. 16 is a diagram showing a laser irradiating chamber in the embodiment.
Figure 17:
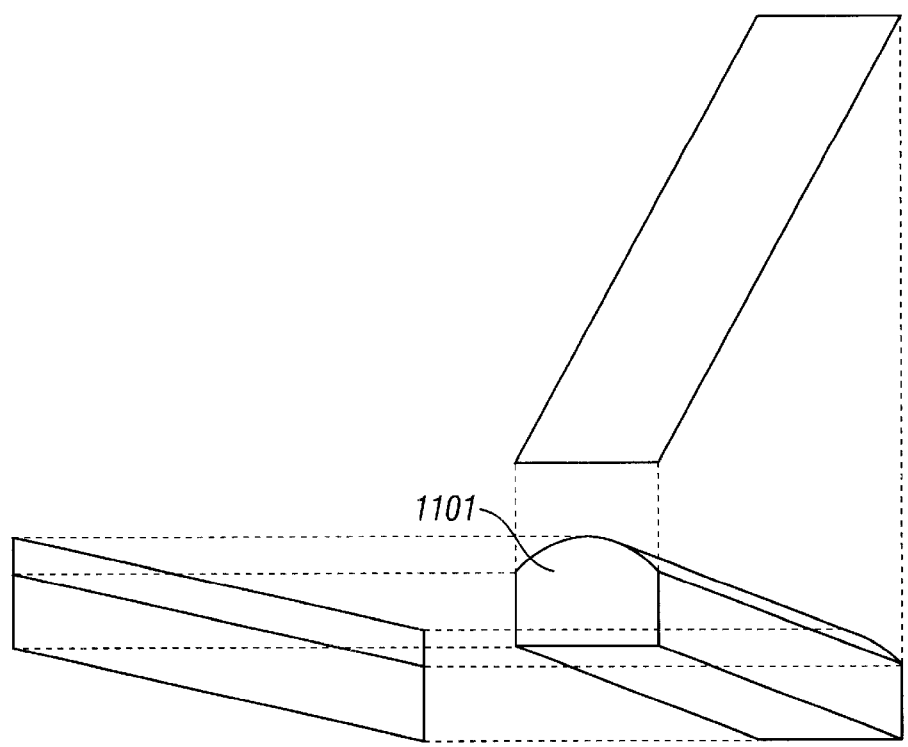
FIG. 17 is a diagram showing the parallelogram cylindrical lens.

In this embodiment, non-monocrystal silicon films A, B and C are crystallized using the optical system shown in FIG. 16, or in order to further enhance the crystallinity, laser annealing is conducted using an excimer laser.

The parallelogram cylindrical lens group 1105 built in the optical system 901 is arranged to divide the beam longitudinally. The parallelogram cylindrical lens 1601 is arranged to converge the divided beams in one region.

In this embodiment, the original beam is laterally divided into ten to average the distribution of the energy of the beam. A lens that converges the laser beam into a linear beam is a cylindrical lens 207.

Figure 13:
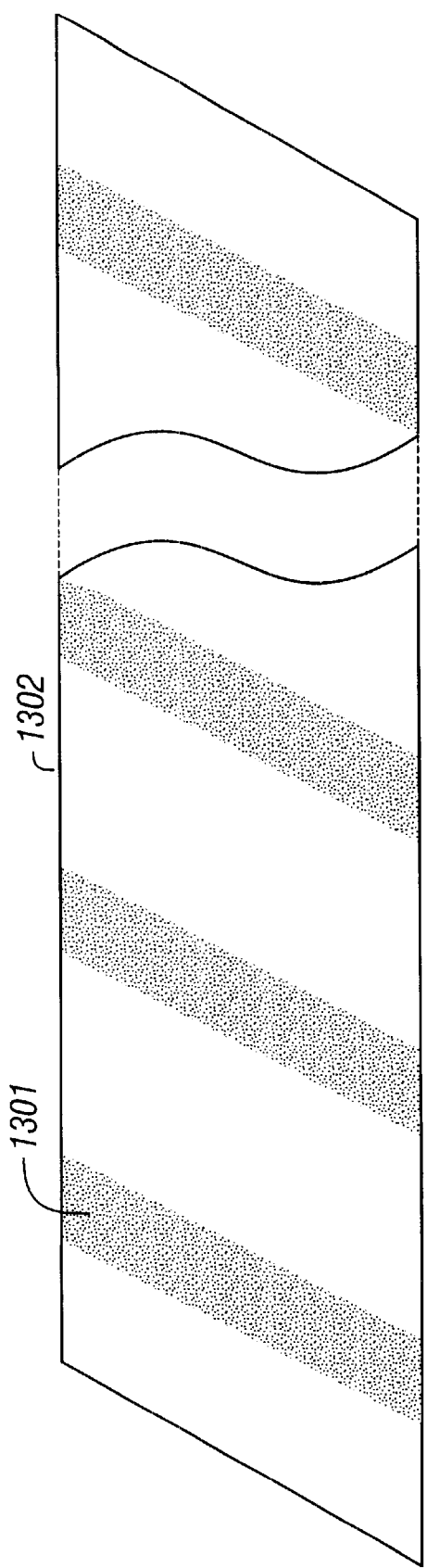
FIG. 13 is a diagram showing an appearance of the light interference within the linear laser beam which has been processed through the optical system using the parallelogram cylindrical lens.
Figure 14:
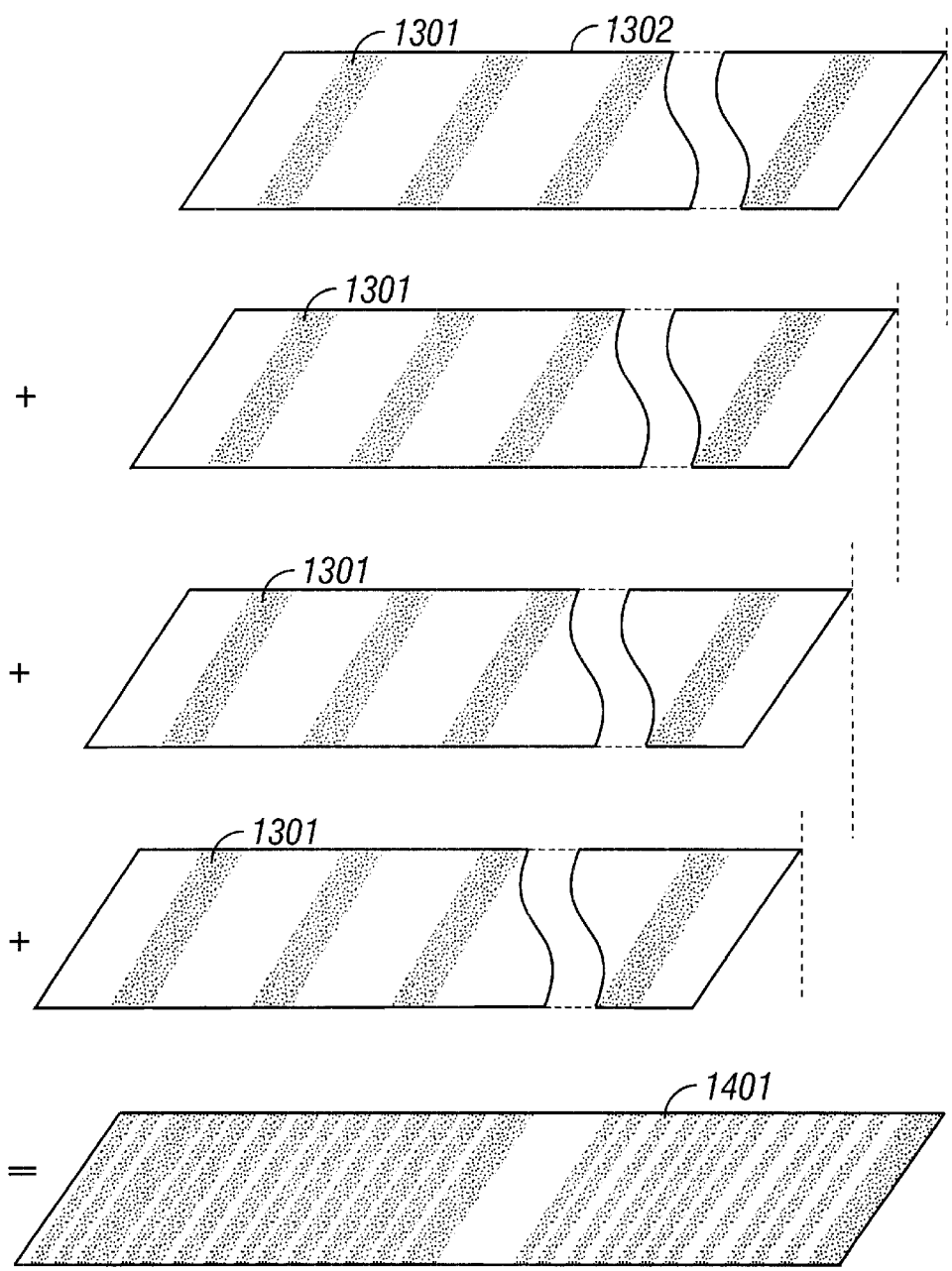
FIG. 14 is a diagram showing an appearance that the light interference within the linear laser beam is dispersed through an optical system using the parallelogram cylindrical lens.
Figure 15:
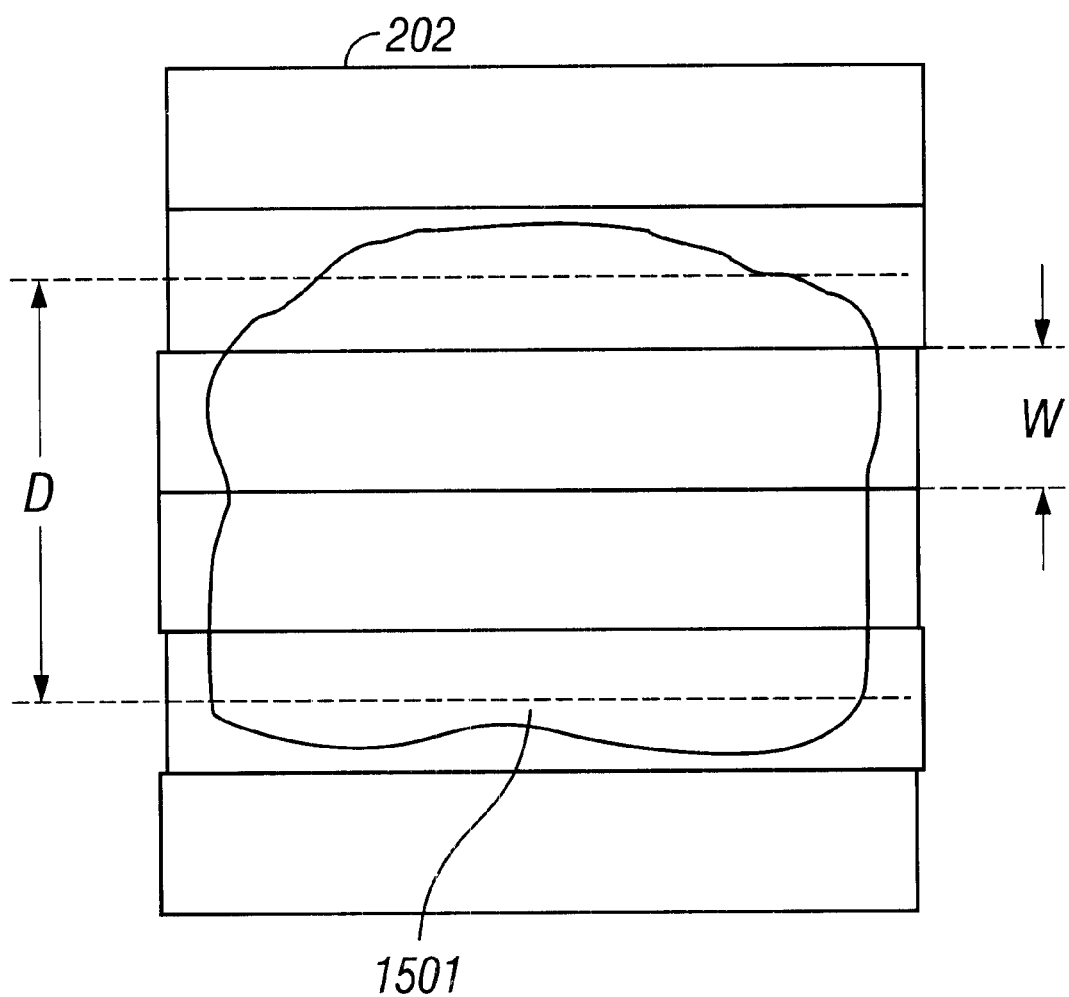
FIG. 15 is a diagram regulating the size of the cylindrical lens group 202.

Ideally, the cylindrical lens is a lens that can converge the laser beam in a complete linear beam, but in this embodiment, the focal point of the cylindrical lens 207 is slightly shifted from the plane to be irradiated to produce a beam 0.3 mm in beam width. In this embodiment, the interference stripes are formed in the form of stripes as shown in FIG. 13. This is because in this embodiment, the beam is not divided in the beam width direction. It is needless to say that the present invention is effectively operated with respect to the above interference stripes.

In this situation, when the linearity of the outline that constitutes the scanning direction side of the linear beam is enhanced using a laser beam shielding plate 1601, laser annealing can be more uniformly conducted.

Since it has been experientially found that the linearity of the scanning direction side of the linear laser beam contributes to the uniformity of laser annealing remarkably larger than the linearity of the opposite side of the scanning direction, the number of the laser shielding plate is satisfactorily one. However, in the case where the shape of the laser beam emitted from the laser oscillator is very distorted, the laser beam must be shaped into a linear beam by using slits.

This embodiment obtains the effect even using the lenses arranged as shown in FIG. 4 or 5.

Although the cylindrical lens groups 1105 is convex lenses, the essence of the present invention is adversely affected by using of concave lenses or lenses mixing the convex and concave lenses. The details were described in Embodiment 1.

The laser oscillating device 201 oscillates an XeCl excimer layer (308 nm in wavelength). Instead, a KrF excimer laser (248 nm in wavelength) or the like may be used.

The substrate 902 to be processed is located on the stage 903. The stage 903 is straightly moved in a direction perpendicular to the linear direction of the linear laser beam (including a plane containing the linear laser beam) so that the laser beam can be irradiated on the upper surface of the substrate 902 to be processed while it is scanned.

This embodiment uses the linear laser, but even if any beam shapes including the linear shape and the rectangle are employed in the present invention, the effects of the present invention are obtained.

Embodiment 4

In Embodiment 3, in the case where the stripe pattern does not well disappear, the arrangement of the optical system is improper, the intervals of the superimposition of the linear laser beams are improper, or the angle Y of the parallelogram cylindrical lens 1106 is improper. In fact, at a stage of designing the optical system, if the arrangement of the peaks of interference is calculated so that an angle appropriate to the condition is obtained, the parallelogram cylindrical lens 1106 must be manufactured in the order made. This leads to a very expensive lens.

Therefore, this defect is compensated by a method of determining the scanning direction as shown in FIG. 8. That is, the same procedure as that in the method described in Embodiment 2 may be applied.

Embodiment 5

In this embodiment, the non-monocrystal silicon films A, B and C are crystallized using the optical system described in the third aspect of the present invention, or in order to further enhance the crystallinity, laser annealing is conducted using an excimer laser.

Figure 18:
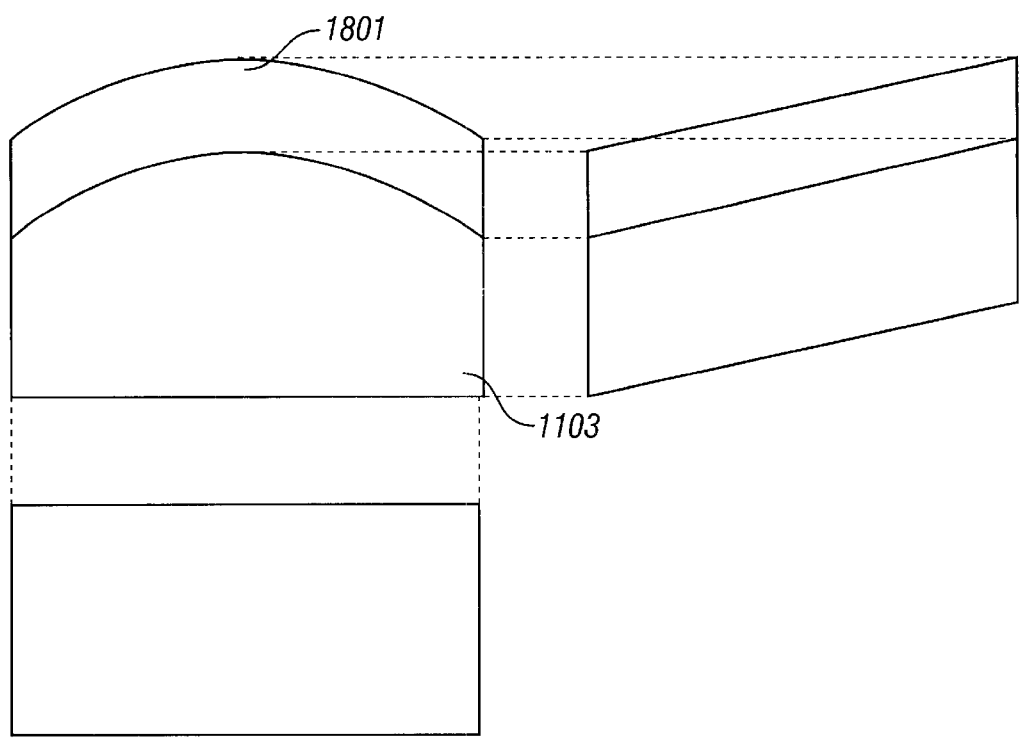
FIG. 18 is a diagram showing the parallelogram cylindrical lens.
Figure 19:
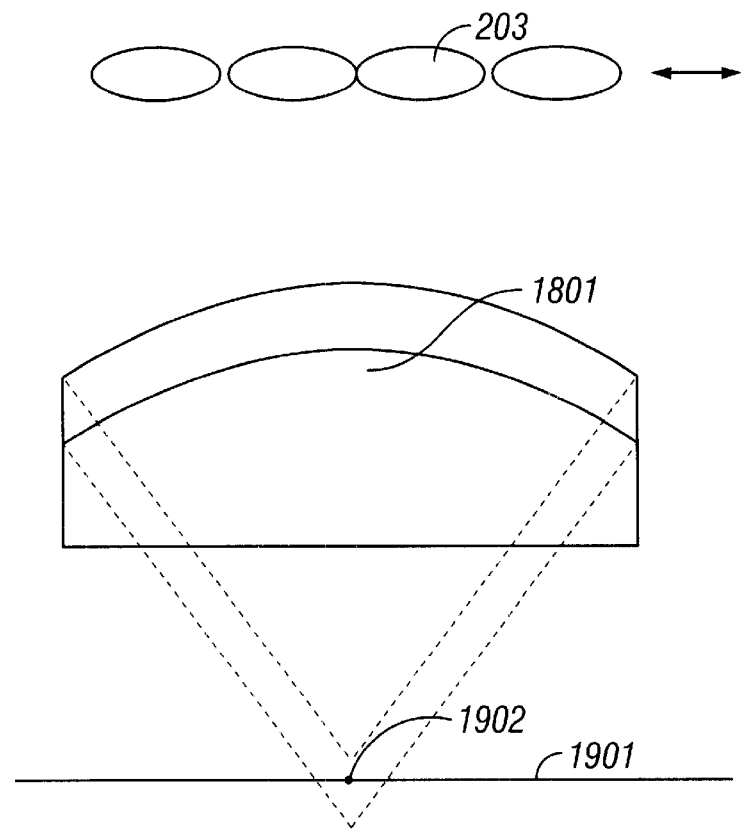
FIG. 19 is a diagram showing a method of changing an appearance of the light interference within the linear laser beam which has been processed through the optical system including the parallelogram cylindrical lens.
Figure 25:
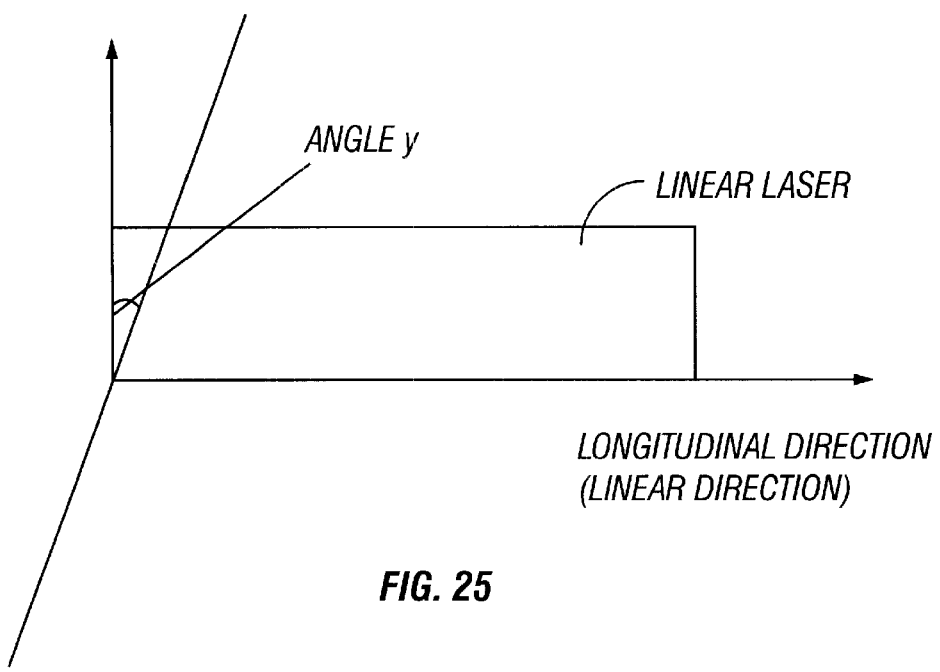
FIG. 25 shows a scanning direction of the laser light.
Figure 20:
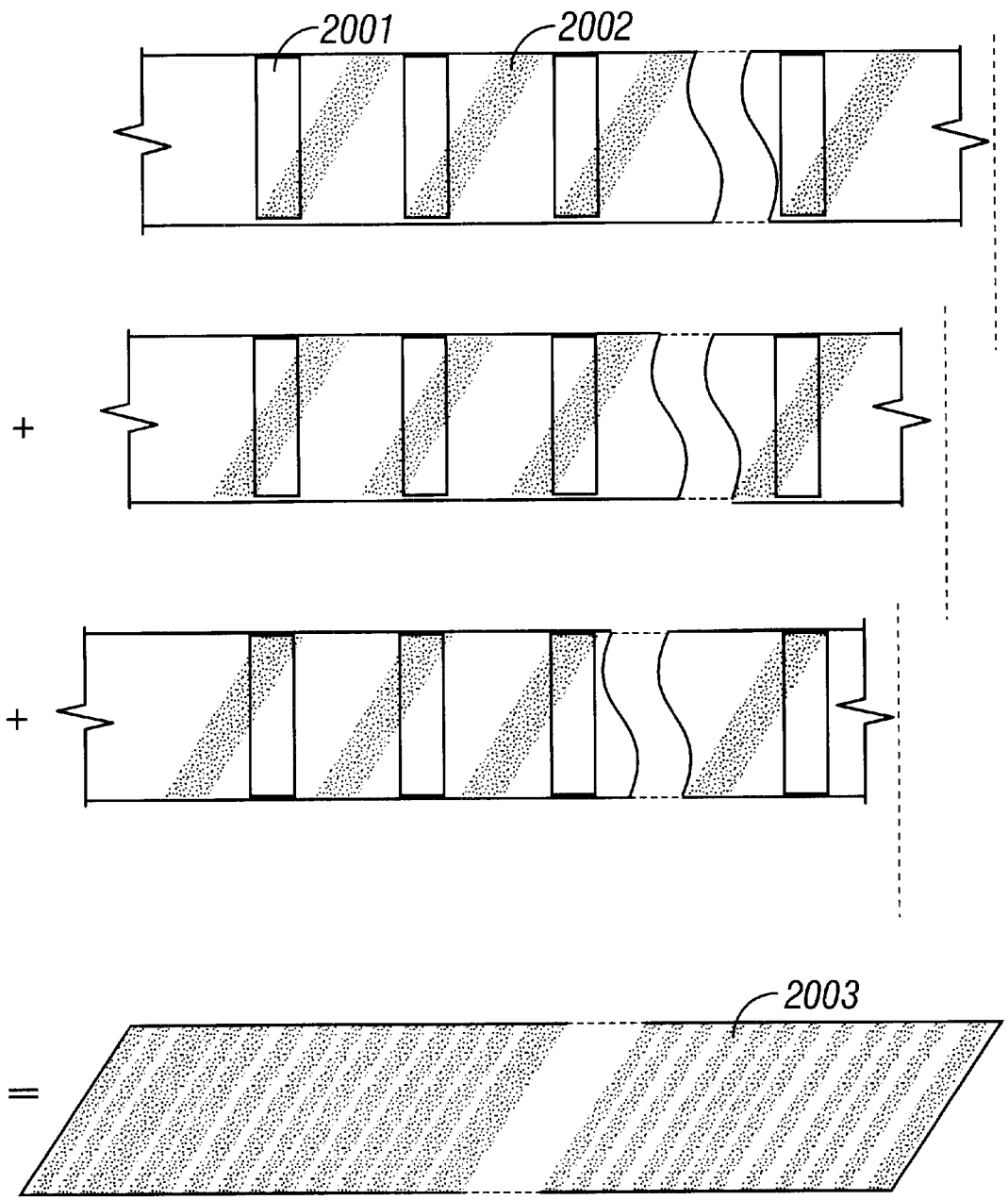
FIG. 20 is a diagram showing an appearance that the light interference within the linear laser beam is dispersed through the optical system using the parallelogram cylindrical lens.
Figure 21:
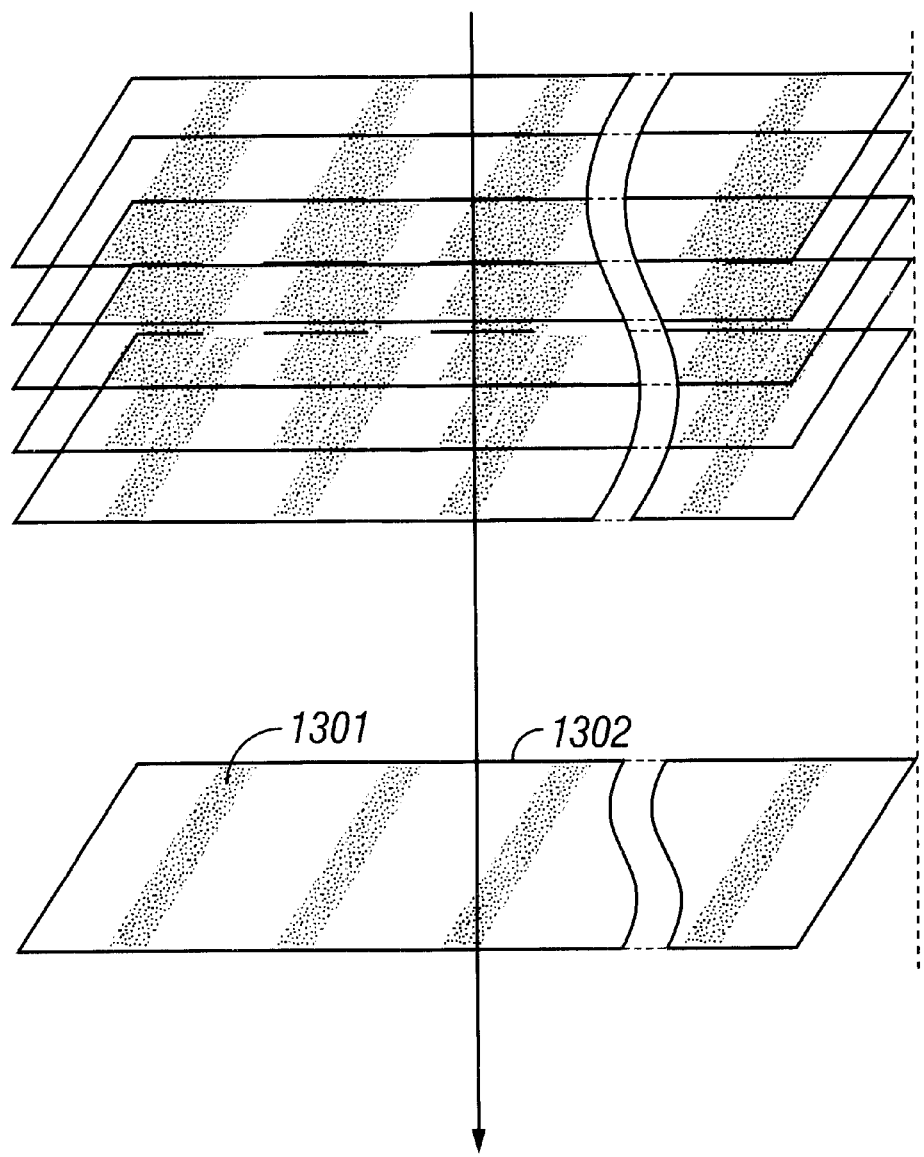
FIG. 21 is a diagram showing an appearance of the laser irradiation that makes the light interference unobtrusive.

In this embodiment, the cylindrical lens 205 in the optical system shown in FIG. 2 is replaced by the parallelogram cylindrical lens 1801 (FIG. 18) having the feature described in the third aspect of the present invention. The angle Y is set to 88°.

In this embodiment, each lens of the cylindrical lens group 203 is 5 mm in width (diameter). In this embodiment, the cylindrical lens group 203 and the parallelogram cylindrical lens 1801 must be arranged facially asymmetrically. After those arrangements are finely adjusted (in this embodiment, they may be shifted laterally relatively by 1.5 mm), laser annealing may be conducted in the same manner as that in Embodiment 1.

Embodiment 6

In this embodiment, the non-monocrystal silicon films A, B and C are crystallized using the optical system described in the third aspect of the present invention, from which the division of the beam widthwise is omitted, or in order to further enhance the crystallinity, laser annealing is conducted using an excimer laser.

In this embodiment, the cylindrical lens 205 in the optical system shown in FIG. 2 is replaced by the parallelogram cylindrical lens 1801 having the feature described in the third aspect of the present invention. The angle Y is set to 88°.

In this embodiment, each lens of the cylindrical lens group 203 is 5 mm in width (diameter). The cylindrical lens group 202 and the cylindrical lens 204 are removed. That is, the arrangement is completely identical with the arrangement of the optical system shown in FIG. 16.

In this situation, laser annealing could be uniformly conducted by enhancing the linearity of the outline that constitutes the scanning direction side of the linear beam. Since it has been experientially found that the linearity of the scanning direction side of the linear laser beam contributes to the uniformity of laser annealing remarkably larger than the linearity of the opposite side of the scanning direction, the number of the laser shielding plate is satisfactorily one. However, in the case where the shape of the laser beam emitted from the laser oscillator is very distorted, the laser beam must be shaped into a linear beam by using slits.

Although the cylindrical lens groups 203 is convex lenses, the essence of the present invention is adversely affected by using of concave lenses or lenses mixing the convex and concave lenses. The details were described in Embodiment 1.

In this embodiment, the cylindrical lens group 203 and the parallelogram cylindrical lens 1801 must be arranged facially asymmetrically. After those arrangements are finely adjusted (in this embodiment, they may be shifted laterally relatively by 1.5 mm), laser annealing may be conducted in the same manner as that in Embodiment 1.

As was described above, according to the present invention, the quality uniformity within the plane of the effects of laser annealing caused by the laser beam that makes a laser beam uniform in quality due to re-coupling the division can be remarkably improved. In other words, the present invention can solve a problem of the stripe-pattern like irradiation unevenness when the laser beam which has been processed linearly is scanned and irradiated.

What is claimed is:

1. A laser irradiating apparatus including an optical system comprising:

a parallelogram cylindrical lens group to divide a light; and a parallelogram cylindrical lens to re-couple said light into divided beams.

2. A laser irradiating apparatus including an optical system comprising:

a cylindrical lens group to divide a light; and a parallelogram cylindrical lens to re-couple the divided light.

3. A laser irradiating apparatus comprising:

a parallelogram cylindrical lens formed by a locus resulting from moving a sectional shape in parallel to a direction;

wherein said sectional shape can converge two dimensional spacial parallel light beams having a specific wavelength in one point.

4. A laser irradiating apparatus comprising:

a cylindrical lens group to divide a light; and a parallelogram cylindrical lens formed by a locus resulting from moving a sectional shape in parallel to a direction;

wherein said sectional shape can converge two dimensional spacial parallel light beams having a specific wavelength in one point; and wherein said parallelogram cylindrical lens re-couples the divided light.

5. A laser irradiating apparatus comprising:

a parallelogram cylindrical lens group to divide a light; and a parallelogram cylindrical lens formed by a locus resulting from moving a sectional shape in parallel to a direction;

wherein said sectional shape can converge two dimensional spacial parallel light beams having a specific wavelength in one point; and wherein said parallelogram cylindrical lens re-couples the divided light.

6. A laser irradiating apparatus comprising:

a cylindrical lens group to divide a light beam; and a parallelogram cylindrical lens formed by a locus resulting from moving a sectional shape in parallel to a direction;

wherein said sectional shape can converge two dimensional spacial parallel light beams having a specific wavelength in one point; and wherein said parallelogram cylindrical lens re-couples the divided light beam, wherein said parallelogram cylindrical lens is shaped such that a plane made by the collection of focal points formed when the parallel lights are made mutually incident from an arbitrary direction is orthogonal to a plane including said sectional shape, wherein said sectional shape and said direction form an angle Y, and wherein said angle Y is not a right angle.

7. An apparatus according to claim 6 wherein said angle Y is in the range of $1.5 \leq |\tan Y| \leq 600$.

8. An apparatus according to claim 6 wherein said angle Y is in the range of $12 \leq |\tan Y| \leq 300$.

9. A laser irradiating apparatus comprising:

a parallelogram cylindrical lens group to divide a light; and a parallelogram cylindrical lens formed by a locus resulting from moving a sectional shape in parallel to a direction;

wherein said sectional shape can converge two dimensional spacial parallel light beams having a specific wavelength in one point; and wherein said parallelogram cylindrical lens re-couples the divided light, wherein said parallelogram cylindrical lens is shaped such that a plane made by the collection of focal points formed when the parallel lights are made mutually incident from an arbitrary direction is orthogonal to a plane including said sectional shape, wherein said sectional configuration and said direction form an angle Y, and wherein said angle Y is not a right angle.

10. An apparatus according to claim 9 wherein the angle Y is within the limit of $1.5 \leq |\tan Y| \leq 600$.

11. An apparatus according to claim 9 wherein the angle Y is within the limit of $12 \leq |\tan Y| \leq 300$.

12. A laser irradiating apparatus comprising:

a parallelogram cylindrical lens group including a plurality of parallelogram first cylindrical lenses, each of said parallelogram first cylindrical lenses being formed by a locus resulting from moving a sectional shape in parallel to a direction; and a parallelogram second cylindrical lens having a same characteristic as said parallelogram first cylindrical lens;

wherein said sectional shape can converge two dimensional spacial parallel light having a specific wavelength in one point;

wherein each of said parallelogram first and second cylindrical lenses is shaped such that a plane made by the collection of focal points formed when the parallel lights are made mutually incident from an arbitrary direction is orthogonal to a plane including said sectional shape, and wherein said sectional shape and said direction form an angle Y, wherein said angle Y is equal to each other in the respective parallelogram first and second cylindrical lenses, and wherein said angle Y is not a right angle.

13. An apparatus according to claim 12 wherein said angle Y is in the range of $1.5 \leq |\tan Y| \leq 600$.

14. An apparatus according to claim 12 wherein said angle Y is in the range of $12 \leq |\tan Y| \leq 300$.

15. A laser irradiating apparatus, comprising:

a means for generating a laser beam;

lenses including a parallelogram cylindrical lens group that unifies the distribution of energy of a linear laser beam in a linear direction thereof, which is a final processed configuration while enlarging said laser beams after being divided, and a parallelogram first cylindrical lens;

a second cylindrical lens to converge said laser beams in a line; and a movable table variable in its moving direction.

16. An apparatus to claim 15 wherein said laser beam is an excimer laser.

17. A laser irradiating apparatus comprising:

a means for generating a laser beam;

lenses including a parallelogram cylindrical lens group that unifies the distribution of energy of a linear laser beam in a linear direction thereof, which is a final processed configuration while enlarging said laser beams after being divided, and a parallelogram first cylindrical lens;

a second cylindrical lens to converge said laser beam in a line; and a movable table that moves in one direction.

18. An apparatus according to claim 17 wherein said laser beam is an excimer laser.

19. A laser irradiating apparatus comprising:

a means for generating a laser beam;

lenses including a parallelogram first cylindrical lens group that unifies the distribution of energy of a linear laser beam in a linear direction thereof, which is a final processed configuration while enlarging said laser beams after being divided, and a parallelogram first cylindrical lens;

lenses including a second cylindrical lens group to converge said laser beam in a line by re-coupling said laser beam which has been divided, and a parallelogram second cylindrical lens; and a movable table that moves in one direction.

20. An apparatus according to claim 19 wherein said laser beam is an excimer laser.

21. A laser irradiating apparatus comprising:

a means for generating a laser beam;

first lenses including a parallelogram first cylindrical lens group that unifies the distribution of energy of a linear laser beam in a linear direction thereof, which is a final processed configuration while enlarging said laser beams after being divided, and a parallelogram first cylindrical lens;

second lenses including a second cylindrical lens group that converges said laser beam in a line by re-coupling said laser beam which has been divided, and a parallelogram second cylindrical lens; and a movable table variable in its moving direction.

22. An apparatus according to claim 21 wherein said laser beam is an excimer laser.

* * * * *